United States Patent
Schneier et al.

(10) Patent No.: US 7,159,237 B2
(45) Date of Patent: Jan. 2, 2007

(54) METHOD AND SYSTEM FOR DYNAMIC NETWORK INTRUSION MONITORING, DETECTION AND RESPONSE

(75) Inventors: Bruce Schneier, Minneapolis, MN (US); Andrew H. Gross, San Jose, CA (US); Jonathan D. Callas, San Jose, CA (US)

(73) Assignee: Counterpane Internet Security, Inc., Mountain View, CA (US)

( * ) Notice: Subject to any disclaimer, the term of this patent is extended or adjusted under 35 U.S.C. 154(b) by 842 days.

(21) Appl. No.: 09/766,343

(22) Filed: Jan. 19, 2001

(65) Prior Publication Data

US 2002/0087882 A1 Jul. 4, 2002

(51) Int. Cl.
  G06F 7/04 (2006.01)
  G06F 11/00 (2006.01)
  H09K 1/00 (2006.01)
  G06F 15/16 (2006.01)
  G06F 15/173 (2006.01)

(52) U.S. Cl. ................ 726/3; 726/1; 726/2; 726/6; 726/11; 726/12; 726/13; 726/22; 726/23; 726/725; 709/223; 709/226; 709/229

(58) Field of Classification Search ........ 713/200–201; 709/208, 220, 223–229; 726/1–3, 11–13, 726/22–25, 6
See application file for complete search history.

(56) References Cited

U.S. PATENT DOCUMENTS

| | | | |
|---|---|---|---|
| 5,796,942 A * | 8/1998 | Esbensen | 713/201 |
| 5,909,493 A | 6/1999 | Motoyama | |
| 6,088,804 A * | 7/2000 | Hill et al. | 726/25 |
| 6,119,236 A * | 9/2000 | Shipley | 726/22 |
| 6,182,226 B1 * | 1/2001 | Reid et al. | 713/201 |
| 6,205,551 B1 | 3/2001 | Grosse | |
| 6,363,489 B1 * | 3/2002 | Comay et al. | 713/201 |
| 6,519,703 B1 * | 2/2003 | Joyce | 726/22 |
| 6,681,331 B1 * | 1/2004 | Munson et al. | 713/201 |
| 6,704,874 B1 * | 3/2004 | Porras et al. | 713/201 |

OTHER PUBLICATIONS

M2 Presswire, Sep. 3, 1999, pp. 1-3.*
VPNTrust: Consulting, 1999, pp. 1-3.*

(Continued)

*Primary Examiner*—Ayaz Sheikh
*Assistant Examiner*—Jenise Jackson
(74) *Attorney, Agent, or Firm*—Philip H. Albert; Townsend and Townsend and Crew

(57) ABSTRACT

A probe attached to a customer's network collects status data and other audit information from monitored components of the network, looking for footprints or evidence of unauthorized intrusions or attacks. The probe filters and analyzes the collected data to identify potentially security-related events happening on the network. Identified events are transmitted to a human analyst for problem resolution. The analyst has access to a variety of databases (including security intelligence databases containing information about known vulnerabilities of particular network products and characteristics of various hacker tools, and problem resolution databases containing information relevant to possible approaches or solutions) to aid in problem resolution. The analyst may follow a predetermined escalation procedure in the event he or she is unable to resolve the problem without assistance from others. Various customer personnel can be alerted in a variety of ways depending on the nature of the problem and the status of its resolution. Feedback from problem resolution efforts can be used to update the knowledge base available to analysts for future attacks and to update the filtering and analysis capabilities of the probe and other systems.

42 Claims, 9 Drawing Sheets

OTHER PUBLICATIONS

Fratto, Nov. 1, 1998, vol. 9, iss. 20; p. 68, p. 1-12.*
M2 Presswire, Aug. 31, 1999, p. 1.*
http://www.redsiren.com, p. 1-3.*
http://www.rkontechnologies.com.*
Messmer, Apr. 3, 2000, Network World.*
Communication News, Jun. 2000.*
Savage, Computer Reseller News, Sep. 25, 2000.*
Information Week, 2000, No. 792, p. 244.*
Essex, Computerworld, Jun. 12, 2000.*
Blacharski, Network Magazine, Aug. 1, 2000.*
ENT, Nov. 22, 2000.*
Computel white papers, 2001, pp. 1-4.*
Balasubramaniyan, J. S. et al., "An Architecture for Intrusion Detection Using Autonomous Agents," Center for Education and Research in Information Assurance and Security, CERIAS Technical Report May 1995, Jun. 11, 1998, pp. 1-19.
Hunteman, W., "Automated Information System—(AIS) Alarm System," University of California, Los Alamos National Laboratory, In Proceedings of the 20th National Information Systems Security Conference, National Institute of Standards and Technology, Oct. 1997, pp. 1-12.
Citation details: "Automated Information System—(AIS) Alarm System," W. Hunmteman, http://citeseer.nj.nec.com/context/1642652/0, downloaded Oct. 19, 2001, 1 p.
Neumann, P. G. et al., "Experience with Emerald to Date," Computer Science Laboratory, SRI International, 1st USENIX Workshop on Intrusion Detection and Networking Monitoring, Santa Clara, California, Apr. 11-12, 1999, pp. 73-80, http://www.csl.sri.com/users/neumann/det99.html, downloaded Oct. 19, 2001, pp. 1-9.
Porras, P. A. et al., "EMERALD: Event Monitoring Enabling Responses to Anomalous Live Disburbances," Computer Science Laboratory, SRI International, 20th NISSC —Oct. 9, 1997 pp. 1-22 (version with legible text but no figures), pp. 1-13 (version with figures but illegible text).
"FAQ: Network Intrusion Detection Systems," Version 0.3, Jan. 1, 1998, http://www.robertgraham.com/pubs/network-intrusion-detection.txt, downloaded Oct. 19, 2001, pp. 1-29.

* cited by examiner

Incident Escalation:

Customer Service Escalation:

Technical Support Escalation:

METHOD AND SYSTEM FOR DYNAMIC NETWORK INTRUSION MONITORING, DETECTION AND RESPONSE

FIELD OF THE INVENTION

This invention relates generally to network security and, more specifically, to methods and systems for dynamic network intrusion monitoring, detection and response.

BACKGROUND OF THE INVENTION

Most computer and network security products focus on prevention. Firewalls prevent unauthorized traffic from entering a company's internal network; authentication mechanisms prevent unauthorized persons from logging on to a company's computers; and encryption prevents unauthorized persons from reading files. But because such products cannot be relied upon to work perfectly, and because security bugs may exist in other software or hardware, complete network security also requires monitoring, detection and response in the event of a breach.

An effective monitoring, detection and response system should be designed not to replace a customer's system administrators but to augment their abilities. System administrators normally do not have the time or ability to read through large amounts of constantly updated audit information, looking for attacks on their systems. They also do not have the time to continuously monitor hacker activities, looking out for new tactics, tools and trends. Finally, they do not have the time to become experts on every kind of intrusion and to maintain that expertise.

A monitoring, detection and response system that employs human intelligence, uses trained personnel in the loop, and takes advantage of security intelligence and other knowledge databases can provide customer system administrators the advice and coaching they need, when they need it, to help them repel attacks and maintain network integrity and uptime. While automatic defenses may work against automated attacks, they are at a disadvantage against an intelligent attack, against which is needed the kind of intelligent defense offered by the present invention.

SUMMARY OF THE INVENTION

The present invention offers methods and systems for dynamic network intrusion monitoring, detection and response. In an exemplary implementation, these methods and systems may be used to deploy and provide a managed security monitoring service (the "MSM service") that monitors a customer's network activity using a probe or "sentry" system, collects status data from monitored components, filters or otherwise analyzes the collected data for activity possibly implicating security concerns, alerts and transmits information about such activity to trained security analysts working at secure operations centers ("SOCs"), and then guides the security analysts and customer through an appropriate response (with appropriate follow-up, if necessary).

The MSM service is not intended to replace but to supplement, and thereby render more effective, a customer's existing preventive security products. Such products, which can include firewalls, servers, routers, intrusion detection systems, and other security products, can generate millions of lines of audit information each day. Buried in all that information may be the footprints of ongoing network attacks or intrusions. The MSM service can help filter and analyze all of that audit information in effectively real time to detect such attacks or intrusions.

Once a possible attack or intrusion (referred to more generally as an "incident" or "event") is detected, its characteristics and particulars may then be examined and analyzed by trained security analysts continuously monitoring the customer's network to further understand the incident and eliminate false positives. In analyzing the incident, security analysts can draw upon information and knowledge contained in a variety of databases, including but not limited to security intelligence databases containing information about the characteristics of various hacker techniques and tools and known vulnerabilities in various operating systems and commercial software products and hardware devices. If necessary, security analysts can escalate the handling of the incident according to a variety of predetermined escalation procedures to stop the attack and shut down the vulnerability before the attacker does any damage. In effect, the MSM service acts as a defensive shield for a customer's network.

In an exemplary embodiment, the MSM service may allow for customization and complex data analysis. For example, the service may be customized, either dynamically or offline, to accommodate network-specific needs and to reflect feedback received about the demonstrated efficacy of a real world response to an actual event. Furthermore, data filtering and analysis can include cross-product analysis, which allows the probe/sentry system to correlate and recognize such multiple sensor readings as reflecting the same happening. Such features ensure that the invention is capable of the rapid refinement necessary to combat network attacks.

The specific components of an exemplary implementation of the MSM service would likely include the following:

A. Security Analysts: Security analysts are personnel specializing in the analysis of network attacks. In an exemplary embodiment, such analysts would perform only such analysis and thus develop the most extensive knowledge in the field. In addition, given their access to sensitive customer information, security analysts would preferably pass background checks and be bonded to provide extra assurance for customers of the MSM service.

B. Security Intelligence: In an exemplary implementation, the expertise, knowledge and capabilities of MSM service security analysts can be supplemented by a variety of knowledge databases containing detailed information helpful for investigating, evaluating and responding to incidents. Security intelligence databases can contain information about, among other things, the characteristics of various network hardware and software products, known vulnerabilities of such products, the use and characteristics of various hacker tools, and known effective and ineffective responses to various kinds of attacks. Such databases could be continually updated by the MSM service by, for example, monitoring hacker forums, reviewing security analysts' incident reports, and evaluating customer audit data for new attack footprints.

C. Secure Operations Centers ("SOCs"): MSM service security analysts would preferably work in secure operations centers. To ensure the security of their customer networks, the SOCs should be connected to these networks preferably through cryptographically secured tunnels (also called "pipes" or "pathways"). Furthermore, the SOCs should provide no other interconnection with these pipes and should themselves be physically hardened against attack. Although single SOC operation is possible, multiple, geographically separated SOCs can be used to provide redundancy and additional capacity for increased traffic or failure of one of the SOCs.

D. Probe/Sentry System: The invention generally incorporates one or more probe/sentry systems that may collect data from a variety of software products and hardware to which they are attached. Such systems are preferably located within the customer's firewall and may collect such data from essentially any product or device that can be configured to provide data to a remote device. Once the probe/sentry system collects the data, it then filters or otherwise analyzes such data and then transmits noteworthy information, preferably via a secure connection, in the form of "sentry messages" to a gateway system (described below in section E) at a SOC. Preferably, the system can perform preliminary analysis of the resulting data, either by simple filtering, cross-correlation, cross-analysis, or other means to reduce the immense volume of raw data into core information worthy of further analysis.

E. Gateway System: The invention may also include one or more gateway systems that serve a "gatekeeper" function in linking the probe/sentry systems to a SOC. Two possible functions of such a gateway system are (1) to reformat, add, or delete information to incoming messages from the probe/sentry systems ("sentry messages") to ensure maximum utility of the output "gateway messages" and (2) to allow mutual "pulse monitoring" by the gateway and probe systems of their counterparts to ensure that each system is continuously operational. This latter function might allow probe/sentry systems to initiate contact with a redundant gateway system to ensure that each probe/sentry system is continuously connected to a SOC at all times.

F. The "SOCRATES" Problem and Expertise Management System: In an exemplary embodiment, security analysts at a SOC work in concert with the "SOCRATES"[1] problem and expertise management system to categorize, prioritize, investigate and respond to customer incidents or "problems." The SOCRATES system, among other things, collects and formats gateway messages into "problem tickets" (each of which represents a discrete security-related event or incident of possible intrusive activity happening on a customer's network), associates with each such ticket information useful for problem investigation, resolution and response, presents such tickets to security analysts for handling, and generally serves as a repository of useful information and procedures. Preferably, in the process of orchestrating the management of problem tickets, the SOCRATES system continuously augments problem-solving tools such as tables which tie symptoms to technology, symptoms to diagnosis, or vulnerability to diagnosis. This continuous improvement allows the invention to take full advantage of specialized nature of the monitoring system.

[1] "SOCRATES" is an acronym standing for Secure Operations Center Responsive Analyst Technical Expertise System.

BRIEF DESCRIPTION OF THE FIGURES AND APPENDICES

Appendix A provides specific details pertaining to an exemplary system for the transfer of information between customer networks and gateway systems (the "Pipes Protocol").

Appendix B provides possible configuration details for an exemplary embodiment of the problem and expertise management system.

Appendix C provides details regarding the scope and structuring of information that might be retained and utilized by an exemplary embodiment of the problem and expertise management system.

DETAILED DESCRIPTION OF THE INVENTION

Figure 1:
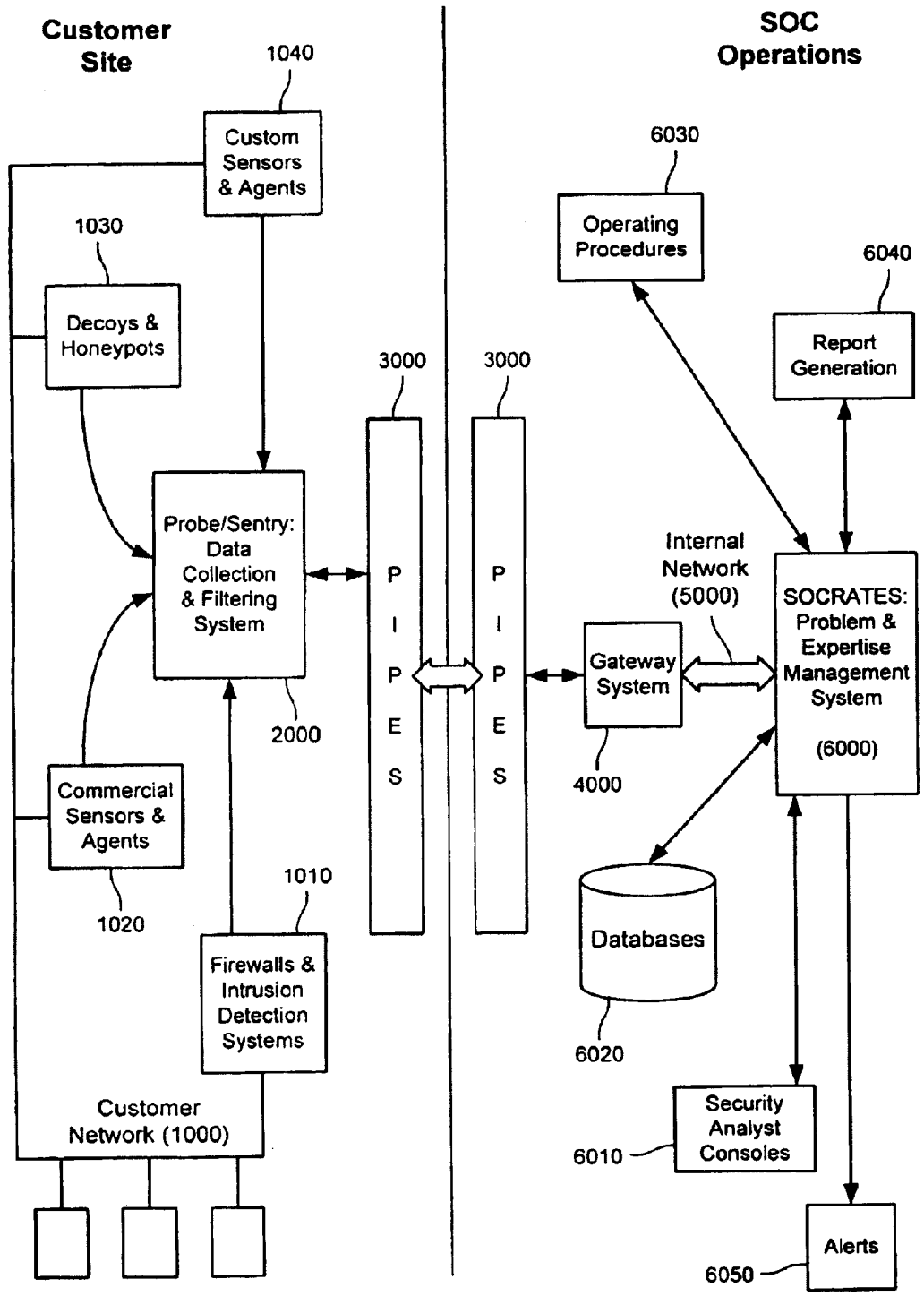
FIG. 1 is an overview of the system architecture of an exemplary embodiment of the present invention.

FIG. 1 is a overview of the systems in an MSM service exemplary implementation of the present invention. FIG. 1 is divided into two portions, components and systems that operate on the customer site (that is, within the customer's firewall) and components and systems that operate within the SOC (that is, within the SOC firewall). A single SOC can monitor and service multiple customer sites, and a single customer site can be monitored by multiple probe/sentry systems. For ease in understanding, this discussion assumes a single SOC servicing a single customer site being monitored by a single probe/sentry system.

Probe/sentry system 2000, which can be implemented in software or hardware or a combination of software and hardware, monitors sensors attached to customer network 1000 for evidence of potential security-related events happening on network 1000. Such sensors can include firewalls and intrusion detection systems 1010, commercially available sensors and agents 1020, decoys and honeypots 1030 (monitored devices or programs specifically and solely designed to attract the attention of, and thereby expose, a would-be intruder), and custom sensors and agents 1040. More generally, probe/sentry system 2000 can monitor and collect information from any network component (whether software or hardware or a combination of both) that can be configured to send or provide to it status data (including audit log data and other audit information) concerning the status of network 1000 and its components.

Both sensors and agents can monitor network components. However, while typically a sensor passively receives status data and audit information from network components set up to send such information to the sensor, an agent is designed to actively seek such information from the components it is monitoring. Sensors may include scanning engines, syslog data providers (including devices such as routers and firewalls), Simple Mail Transfer Protocol ("SMTP") sensors, Simple Network Management Protocol ("SNMP") sensors and SNMP traps. SNMP sensors generally require polling and may require additional software provided by the MSM service, whereas SNMP traps generally send data directly, without prompting. Sensors and agents may be customized for the particular needs of a customer's network, for example, to provide information not provided by those sensors and agents that are commercially available. Commercial security products and devices that may be attached to a customer's network include the following manufacturers and products: NFR, ISS, NETA (McAfee, Gauntlet, Cybercop), NetRanger (Cisco), Dragon, Checkpoint, Lucidian, Symantec, Cisco, Nortel, 3Com, Lucent, Livingston, Tripwire and Centrax.

Probe/sentry system 2000 collects and filters (positively and/or negatively) or otherwise analyzes the constantly updated status data it receives from sensors, using a set of rules and/or filters looking for evidence or "footprints" of unauthorized intrusions. The collected status data can either remain in the customer's hands or be provided to MSM service personnel for further analysis (e.g., cross-customer analysis). The software and filters of probe/sentry system 2000, in a preferred embodiment, may be adaptive or, alternatively, may be manually updated offline or dynamically (that is, during actual operation). In a preferred embodiment, such updates can be sent from the SOC to the probe/sentry system and signed, verified and then securely installed. In a preferred embodiment, probe/sentry system 2000 can also manage updates to other customer software, including antivirus signature files and software, firewall software, and router software. Such updates can be controlled by communications and resource coordinator 2060 within probe/sentry system 2000.

Noteworthy data possibly indicating an unauthorized intrusion or other security-related event are formatted by probe/sentry system 2000 into "sentry messages," which are then sent via "Pipes" communications system 3000 (referred to hereafter as "Pipes 3000") to gateway system 4000 at the SOC.

In a preferred embodiment, Pipes 3000 provides an encrypted, secure communications path and message protocol for messages sent back and forth between probe/sentry system 2000 at the customer site and gateway system 4000 at the SOC. The Pipes protocol preferably runs inside a Transport Layer Security ("TLS") session or other protected path. Either side can send individual messages containing identification information and a payload. Messages, in an exemplary embodiment, can be limited to a maximum size of, for example, 64 k bytes in length. Larger messages could be sent fragmented across several messages with acknowledgements. Appendix A provides specific technical information pertaining to an exemplary Pipes protocol.

Pipes 3000 may be used to manage bandwidth consumption at both ends and can be used by the SOC to send software updates to probe/sentry system 2000. Message flow through Pipes 3000 can be controlled by means of (i) a client program or process running on the probe/sentry end to service queues of incoming messages from and outgoing messages to the SOC; and (ii) a server program or process running on the gateway end to service queues of incoming messages from and outgoing messages to various probe/sentry systems. In an exemplary embodiment, a public key infrastructure ("PKI") scheme using OpenSSL-based TLS and Digital Signature Standard ("DSS") certificates can be used to authenticate both ends of Pipes 3000 as well as the messages being passed back and forth. For example, web delivery of customer network status reports, as well as certain customer requests, might be authenticated. In addition, Pipes 3000 can include a bootstrap protocol to support its initial installation as well as a recovery protocol to support recovery in the event of a probe/sentry or gateway failure.

An exemplary architecture for Pipes 3000 is as follows. A process on the probe/sentry runs as root. This process can keep its control information in a certain directory. To send a message, another process on the probe/sentry can send this root process a Transmission Control Protocol ("TCP") connection on, for example, 127.0.0.1 port XYZ and emit a message in "Pipes User Message Format." A response may then be sent back to the Pipes client indicating success, failure, or enqueued. The Pipes client can maintain a context for the SOC to which it is currently connected. Possible states include "connected" and "attempting to connect." Preferably, the Pipes client should always be connected to a SOC (or attempting to connect). The Pipes client also preferably runs a loop with selects and sleeps such that it processes input from its SOC and from clients on the local machine. The root process running on the probe/sentry can use, for example, port 443 to behave as a normal TLS (SSL) client and can also listen on port 468 ("photuris"). The root process should be started before everything else, so the probe/sentry filtering subsystem can talk to it. A process running on the gateway should listen to port 443. When it gets a call, it should fork a child process that handles the probe/sentry. There should therefore be one process per probe/sentry, although each gateway might be associated with a few hundred or more probe/sentries. There should also be a port 468 connection to the probe/sentry system communications and resource coordinator.

Pipes 3000 may be implemented using a variety of different mechanisms, depending on the customer's needs. One possible mechanism uses a secure Internet connection implemented using, for example, a Virtual Private Network ("VPN"), SSL/TLS, Secure Shell ("SSH"), IP Security ("IPsec") or other techniques. Other alternatives include using leased lines, dial-up lines, or even wireless point-to-point systems. The most demanding customer might employ all of these, with multiple cellular connections (each with a different provider) so that a failure of one cellular provider would not result in missing an alert. In one embodiment, Internet connections could be used predominantly, with slower, alternative connections as backup in case of failure, although some customers might want high priority alerts to be delivered over a cellular link so as not to reveal information to an attacker.

Additional security considerations for Pipes 3000 include the following:
use of TLS
authentication handles based on, for example, signatures
PKI bootstrap
threat model
losses of connections to Sentry or Gateway
Sentry or Gateway integrity compromises Additional possible alternative implementations of Pipes 3000 include the following:
use of openssl s_server and s_client as skeletons
use of dss certificates
use of redfish in place of triple data encryption standard ("TDES") as encryption algorithms
bandwidth manager last
dump messages in input queue for starters
syslog interface Sentry messages sent by probe/sentry system 2000 through Pipes 3000 are received by gateway system 4000 at the SOC and transformed into gateway messages. Such transformation may include reformatting of the data in the sentry messages and/or appending of additional data. (TABLES 6 and 8 of Appendix C provide forms which might be incorporated into SOCRATES 6000 for storing information regarding formatting of messages sent to and from various gateway systems 4000.) The gateway messages are then forwarded, via internal network 5000, on to problem and expertise management ("SOCRATES") system 6000 (hereafter referred to as "SOCRATES 6000"). Gateway system 4000, as well as SOCRATES system 6000, can be implemented in software or hardware or a combination of software and hardware.

SOCRATES 6000 manages the problem resolution process, including (i) storing, managing and processing various kinds of information useful for problem resolution and response; and (ii) generating, from received gateway messages and other information, "problem tickets" representing potential security-related happenings on the customer's network. The kinds of information managed by SOCRATES 6000, which can be stored in various databases 6020, can include security intelligence, customer information, and problem resolution information. TABLE 1 of Appendix C provides a more detailed listing of the types of databases which might be employed in an embodiment of SOCRATES 6000. TABLES 2–19 of Appendix A provide possible information which might be incorporated into such databases.

MSM service security analysts receive problem tickets for handling access information useful for problem investigation, resolution and response, and otherwise interface with SOCRATES 6000 via security analyst consoles 6010. For security reasons, consoles 6010 can be configured so that a given security analyst can have only a limited ability to look at data and/or perform tasks (for example, the security analyst might be given access to only the keyboard and monitor of each terminal and/or token-based authentication might be required for access to systems). In an exemplary embodiment, each security analyst at a SOC sits at a console 6010, and each console 6010 has three terminals, two secure internal SOC terminals and one secure external terminal. The external terminal can provide secure access to the Internet and to the MSM service's corporate network. The internal SOC terminals can be connected to secure, fully-redundant computers containing, among other things, SOCRATES 6000, a web browser for internal pages, an operations guide, and training materials. Depending on requirements, software for consoles 6010 could be written in Java for easy porting to a wide variety of hardware or be based on certain preexisting commercially available software (for example, automated call database software).

The operation of SOCRATES 6000 can be controlled by operating procedures 6030, which can be tailored to specific customers' needs. Such operating procedures can include, for example, specifying which customer contacts should be notified about what types of events during which hours of the day and how to respond to certain types of attacks. (TABLE 4 of Appendix C suggests a database form capable of providing such information.) Workflow functionality and business rules may also be developed using the SOCRATES system. Such rules can be implemented, for example, using a combination of active links, macros and filters. (TABLES 20–22 of Appendix C provide examples of possible resources that might be implemented on an embodiment of SOCRATES 6000.)

SOCRATES 6000 can generate a variety of reports for customers or internal use through report generation module 6040. For example, a current report may be sent to and accessed directly from probe/sentry system 2000. This report can be web-based and can include the status of the probe/sentry system, the status of open tickets and detailed log information. A weekly report could include incident summaries, open ticket summaries, details on critical and suspicious events, and sensor reports, and could be emailed to the primary customer contact. The weekly report could also include trend analysis of data covering monthly, quarterly and "to-date" data collections and could contain a variety of report sections, including ticket summary (including accumulation of events by type for the week, month, quarter, year), critical tickets summary, top ten events (including weekly, monthly, broken down by event type), known attackers list, top ten targets list, IP watch list (including attack occurrences broken down by day and time), probe/sentry statistics, and known device list.

Report formats can include paper, email or web-based delivery in approximately real time. For security reasons, in a preferred embodiment, web-based connections for delivery of reports can be cryptographically protected, and sending and receipt of such reports authenticated using digital certificates.

SOCRATES 6000 can send alerts 6050 to MSM service personnel or customer contacts. Such alerts can be delivered by a wide variety of means including email, pager, telephone and cellular phone depending on a variety of factors, including the customer's needs, the configuration of the MSM service for the particular customer and contractual terms in a service level agreement. In a preferred embodiment, SOCRATES 6000 can maintain audit logs of all alerts issued, for tracking and other purposes.

Figure 2:
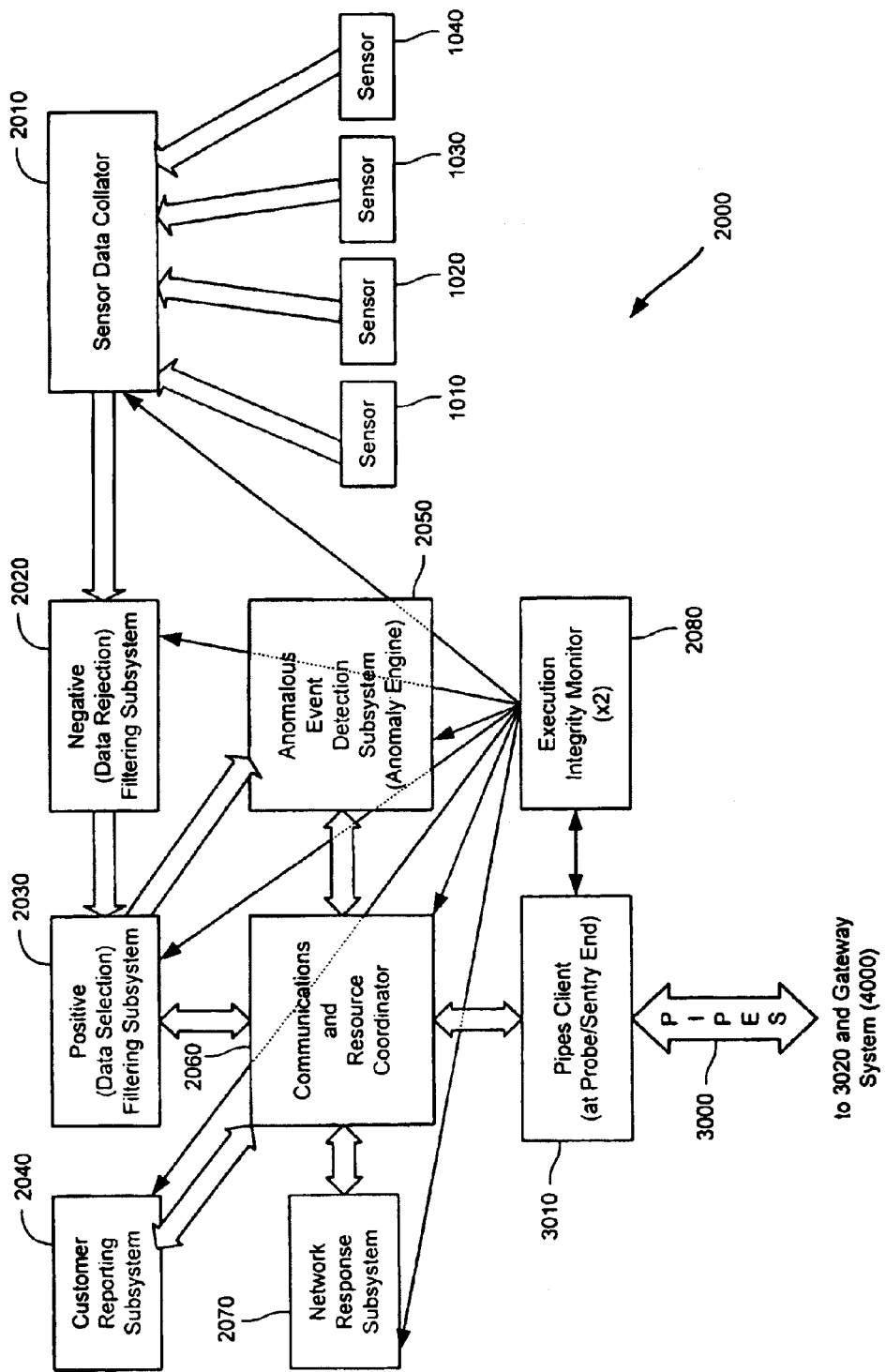
FIG. 2 is a system overview of an exemplary embodiment of a probe/sentry system in an exemplary embodiment of the present invention.

FIG. 2 is a system overview of an exemplary embodiment of a probe/sentry system. One or more such systems can be installed at each customer site to monitor the customer's network and network components. (A database of all network components monitored by such probe/sentry systems may be stored by SOCRATES 6000 in a database similar to that suggested in TABLE 7 of Appendix C.) Data collected by sensors 1010, 1020, 1030 and 1040 (note that four sensors are shown solely by way of example and are not meant to limit the scope of the invention) are collated by sensor data collator 2010. Once collated, the data is first filtered by negative filtering subsystem 2020, which discards uninteresting information, and then by positive filtering subsystem 2030, which selects possibly interesting information and forwards it to communications and resource coordinator 2060. Data neither discarded by negative filtering subsystem 2020 nor selected out as interesting by positive filtering subsystem 2030 form the "residue," which is sent to anomaly engine 2050 for further analysis. Anomaly engine 2050 determines what residue information may be worthy of additional analysis and sends such information to communications and resource coordinator 2060 for forwarding to the SOC. Negative filtering, positive filtering, and residue analysis are examples of data discrimination analyses, other types of which are well-known to those skilled in the art.

Communications and resource coordinator 2060 creates sentry messages out of the interesting status data and forwards those messages on to gateway system 4000 via Pipes 3000. In a preferred embodiment, each sentry message has a sentry identification number (uniquely identifying the sending sentry) as well as a message identification number (identifying the type of problem). (TABLE 6 of Appendix C suggests other information that might be included in such a message.) Communications and resource coordinator 2060 can also manage software updates to probe/sentry system 2000, such as updates to filtering subsystems 2020 and 2030, sent by the SOC. Communications and resource coordinator 2060 can also monitor a "heartbeat" passing between probe/sentry system 2000 and gateway system 4000.

Pipes client 3010 on the probe/sentry end handles sentry messages generated by communications and resource coordinator 2060 and sends those messages through Pipes 3000 on to gateway system 4000. Pipes client 3010 also services queues of incoming messages from and outgoing messages to the SOC.

Customer reporting subsystem 2040 allows a customer to, among other things, check the status of problems that are being worked on by security analysts at the SOC. The SOC can have the ability to push web pages onto probe/sentry system 2000 at the customer's site via Pipes 3000. These pages then are directed by communications and resource coordinator 2060 to customer reporting subsystem 2040. Preferably, a customer, once authenticated, can view such pages using any browser.

Network response subsystem 2070 can, among other things, process and execute requests originating from the SOC designed to mitigate or terminate various attacks. For example, network response subsystem 2070 might be requested by the SOC via Pipes 3000 to not allow a certain IP address to access the customer's network for the next 10 minutes. Such a "fix" might be sufficient to stop a transient attack, such as someone repeatedly trying to log in to the customer's network.

Execution integrity monitor 2080 (which may have a redundant backup) monitors the functioning of each of the components of probe/sentry system 2000 and communicates with the SOC via Pipes 3000 in the event that it detects any malfunction.

Figure 3:
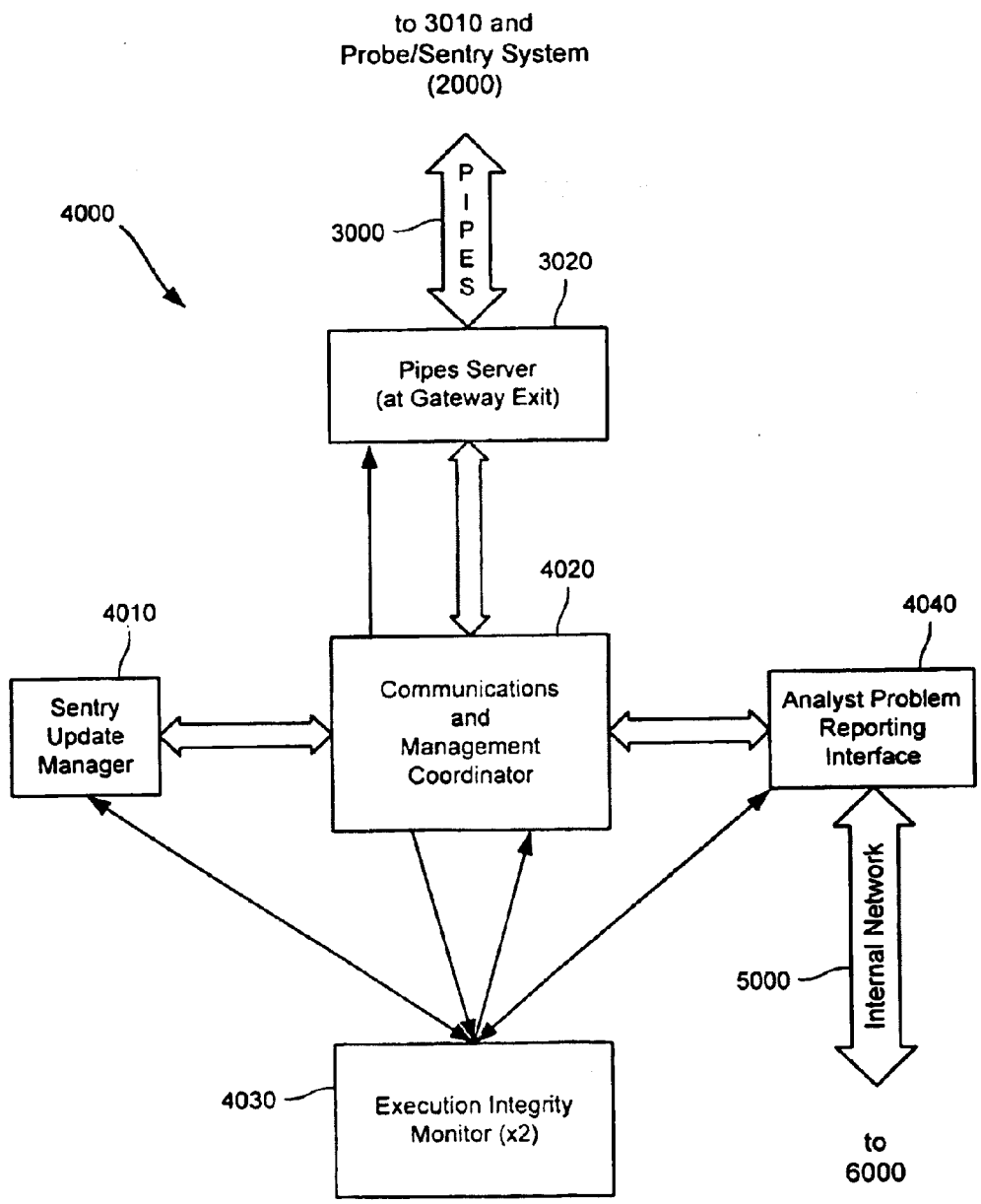
FIG. 3 is a system overview of an exemplary embodiment of a gateway system in an exemplary embodiment of the present invention.

FIG. 3 is a system overview of an exemplary embodiment of a gateway system. Sentry messages from probe/sentry system 2000 travel through Pipes 3000, arrive first at Pipes server 3020 (which manages queues of messages incoming from and outgoing to various probe/sentry systems) and then are passed to communications and management coordinator 4020. Sentry update manager 4010 manages updates, such as software and/or filter updates, to probe/sentry system 2000. Communications and management coordinator 4020 converts sentry messages into gateway messages. Analyst problem reporting interface 4040 then passes these gateway messages on to SOCRATES 6000 via internal network 5000.

Figure 4:
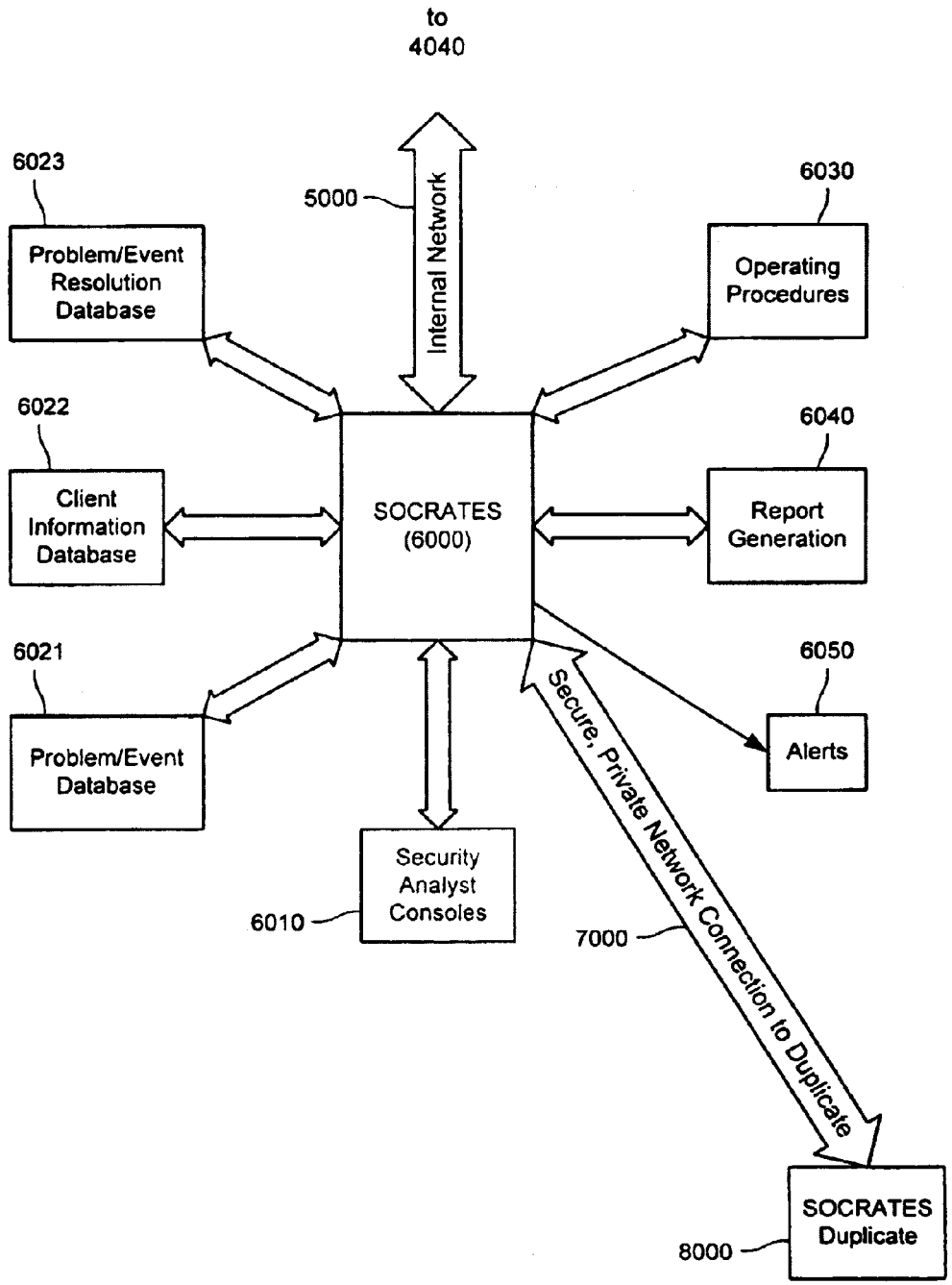
FIG. 4 is a system overview of an exemplary embodiment of a problem and expertise management system in an exemplary embodiment of the present invention.

FIG. 4 is a system overview of an exemplary embodiment of a "SOCRATES" problem and expertise management system. The SOCRATES system is a consolidated system used to manage customers' problems and the supporting data helpful in resolving such problems. It provides security analysts at a SOC a single, integrated system with which to track information concerning, for example, problems, companies, people, contacts, tools, and installed network components and known vulnerabilities. In an exemplary embodiment, the SOCRATES system can include the following capabilities:

communications with probe/sentry systems;
email integration;
access and authority management;
escalation and notification management;
report development;
probe/sentry management through gateway systems;
distributed database;
generation of web-based reports;
addition of servers (as required);
call desk/telephone system integration;
paging integration;
customer surveys; and
service level agreement functionality.

In an exemplary implementation, processing of gateway messages by SOCRATES 6000 proceeds as follows. Gateway messages arrive at SOCRATES 6000 from gateway system 4000 via internal network 5000. SOCRATES 6000 first creates from these gateway messages "event records," which can be stored in problem/event database 6021. Event records may then be linked with other event records stored in problem/event database 6021 and with information from a variety of databases (including customer information from client information database 6022 and problem resolution information from problem/event resolution database 6023) to form "problem tickets," which are then opened and displayed on security analyst consoles 6010 to security analysts for handling. (Appendix C provides more detail on information that might be included in the client information database 6022 (see TABLES 3, 4, 7, and 9), the problem/event resolution database 6023 (see TABLES 13, 14, 18, and 19), and problem tickets (see TABLE 10)). Alternatively, event records reflecting a problem already reflected in an existing and open problem ticket may simply be linked to such open ticket. Redundancy of the SOCRATES system may be achieved by connecting SOCRATES 6000 to SOCRATES Duplicate 8000 via secure private network connection 7000.

Problem/event resolution database 6023 can include, among other things, a database of vulnerabilities. Such a database of vulnerabilities can contain a table or "form" having an entry for each known vulnerability. Vulnerability intelligence may be developed in-house or acquired from outside sources and maintained within the SOCRATES system. In the event vulnerability information from more than one outside source is duplicative or conflicting, the SOCRATES system can maintain a table or "form" for each vendor of vulnerability information. For a more detailed description of possible embodiments, refer to TABLES 11 and 17 in Appendix C.

Figure 5:
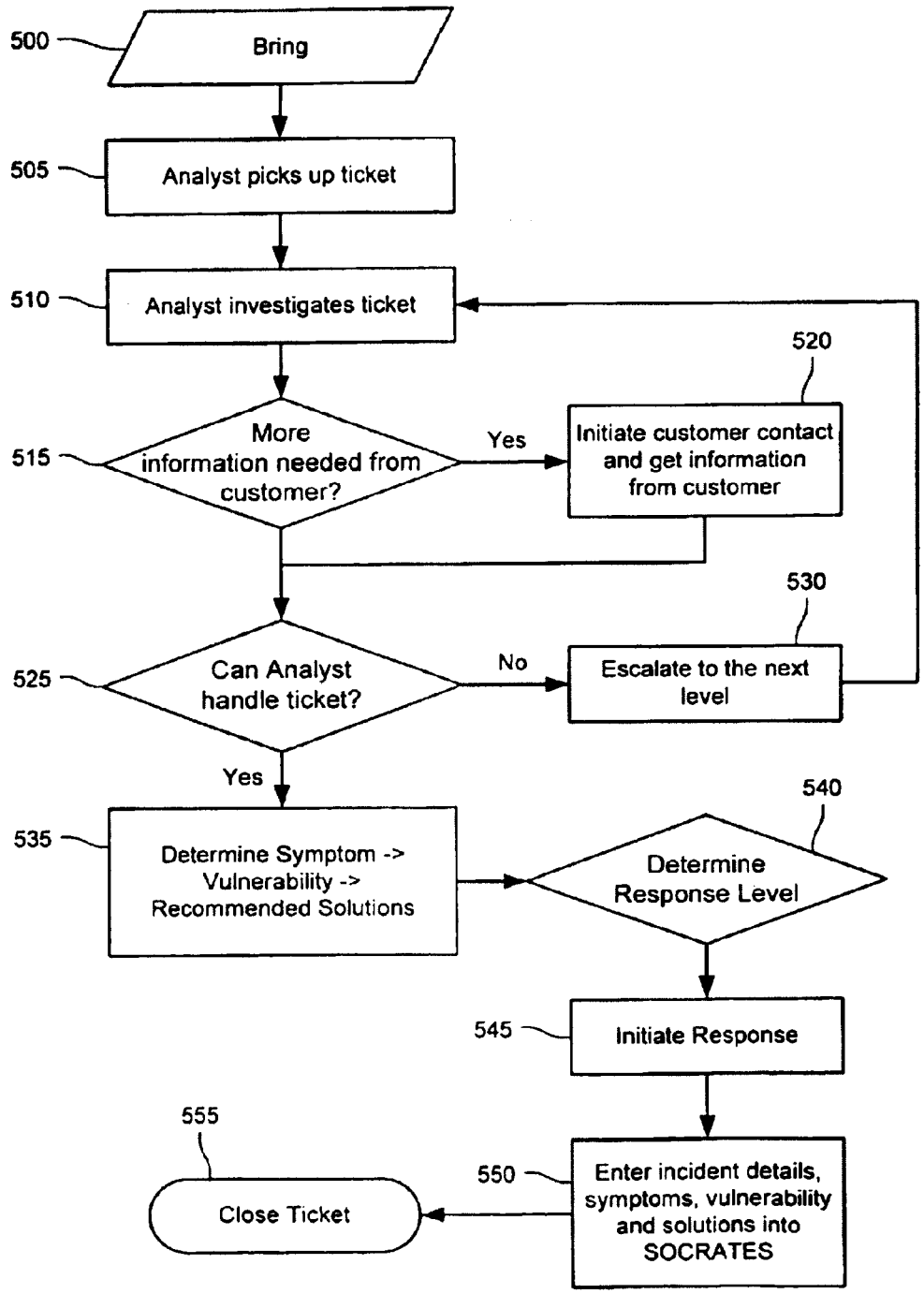
FIG. 5 is a flowchart illustrating an exemplary implementation of incident handling by a security analyst in an exemplary embodiment of the present invention.

FIG. 5 is a flowchart showing an exemplary implementation of incident handling by a security analyst. In step 500, a security analyst is notified by his or her console that a problem ticket has arrived. In step 505, the security analyst picks up the ticket, and in step 510, he or she begins to investigate it. If more information is needed from the customer (step 515), the analyst can contact the customer to get such information (step 520). (A preferred embodiment of the invention may contain forms that provide pertinent information about the customer and its contacts, as provided by way of example in TABLES 3, 4 and 9 of Appendix C). Otherwise, in step 525, the analyst determines whether he or she can handle the ticket or whether the ticket needs to be escalated. If the ticket needs to be escalated (step 530), the ticket can be transferred to another analyst (or security engineer) for investigation (step 510). Once an analyst (or security engineer) is capable of handling the ticket, he or she determines, in step 535, the symptoms, vulnerabilities and recommended solutions associated with the ticket. For example, the analyst (or security engineer) may use SOCRATES 6000 to match the observed symptoms of the attack to a known vulnerability. The analyst (or security engineer) can then search SOCRATES 6000 and its associated security intelligence and other databases for possible solutions. In step 540, the analyst (or security engineer) determines an appropriate response level, and in step 545, he or she initiates such a response.

By knowing the vulnerability, a security analyst should be able to properly respond to the customer, at a response level commensurate with the severity level of the incident. In a preferred embodiment, responses should be predetermined to the extent possible (for example, effective responses to identical incidents in the past can be repeated) in order to shorten response time. For security reasons, in a preferred embodiment, all customer communications should be initiated from within the SOC. Responses to events of differing severity levels might proceed as follows:

Interesting Events: The customer is provided online and/or weekly reports.

Security-Relevant Events: The security analyst sends an encrypted email alert to the customer contact detailing the type of event, ticket number, symptoms, vulnerability and possible solutions for resolving the incident. The email alert can also include a URL to a secure website where the customer (after authentication) can access further detailed information.

Suspicious Events: The security analyst initiates a phone call to the customer contact. If the customer contact is not available, the analyst leaves a message and proceeds to call the next customer contact. Once a customer contact is on the phone with the security analyst, a customer contact authentication process begins. If authentication is successful, the security analyst can inform the customer of the incident and offer solutions to resolve the problem. An encrypted e-mail message can also be sent to the customer informing him of the incident and possible solutions.

Critical Events: The security analyst initiates a phone call to the customer contact. If customer contact is not available, the analyst leaves a message and proceeds to call the next customer contact. Once a customer contact is on the phone with the security analyst, a customer contact authentication process can begin. If authentication is successful, the security analyst can inform the customer of the incident and offer solutions to resolve the problem. After speaking with the primary contact, the security analyst can initiate another phone call to the customer management contact. The analyst can then inform the customer management contact about the incident and relate to whom the analyst previously reported the incident. An encrypted e-mail message can also be sent to the customer contact and customer management contact informing them of the incident, possible solutions and whom the analyst contacted about the incident.

Once the problem has been dealt with and resolved, the analyst, in step 550, enters details of the incident, along with the associated symptoms, vulnerabilities and solutions into SOCRATES 6000 and then closes the ticket (step 555). (TABLES 12, 17, and 5 of Appendix C provides more detail on information that might be included regarding symptoms, vulnerabilities, and diagnoses, respectively.)

Following ticket closure (for example, one or two days later), MSM service customer service personnel can send to the customer an incident survey to get the customer's comments regarding how the incident was handled. In addition, a phone call may be placed to customers whose tickets were critical in nature to make sure the incident was resolved and to get a final "all clear." When all issues have been resolved, customer service can stamp a complete closure on the ticket. An authenticated customer acknowledgment can be required before a critical or suspicious ticket is closed. If unresolved issues are discovered or there are problems that occurred due to the solutions provided by the security analyst, customer service can immediately reopen the ticket, route the call to a security engineer, and inform the appropriate SOC manager that the ticket needs immediate handling.

Figure 6:
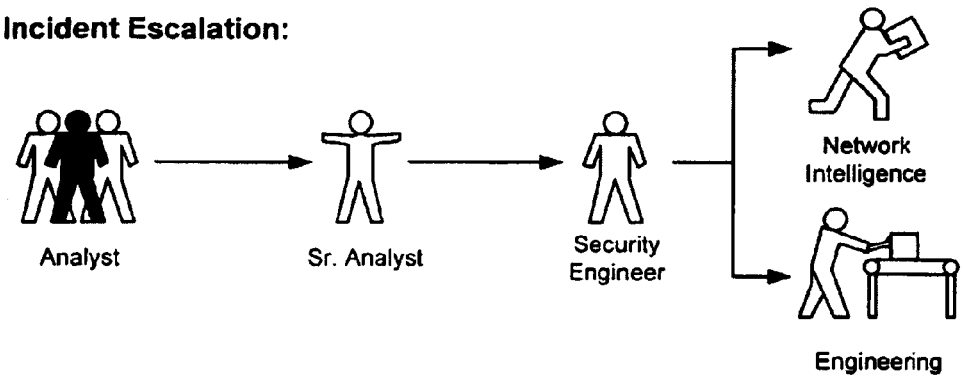
FIG. 6 is a diagram illustrating exemplary escalation paths for various types of escalation in an exemplary embodiment of the present invention.
Figure 6:
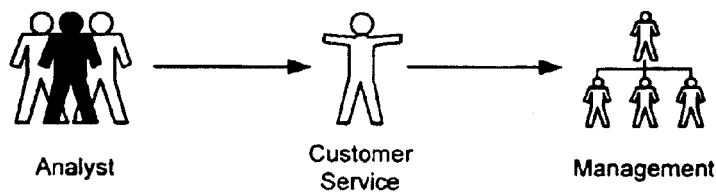
Figure 6:
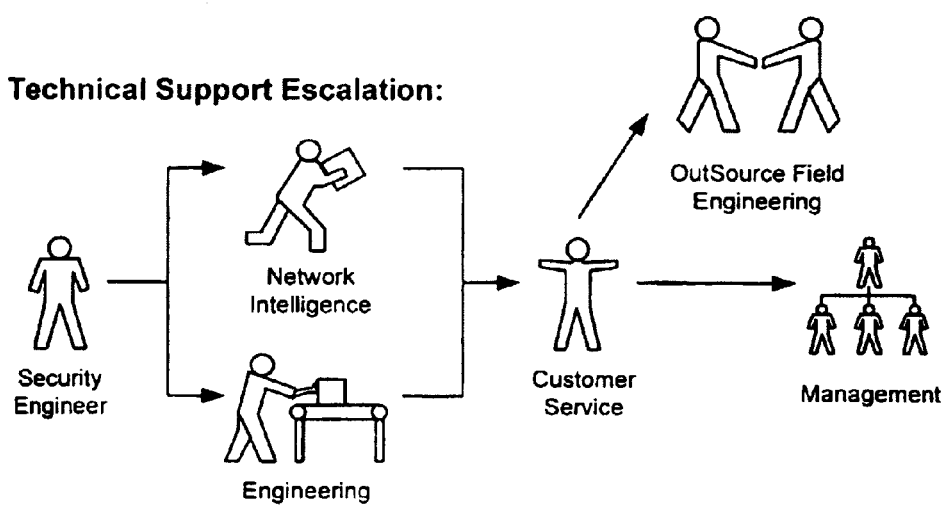

FIG. 6 is a diagram illustrating exemplary escalation scenarios for various types of escalation (incident, customer service and technical support) in an exemplary embodiment of the present invention. For problem resolution purposes, an incident may be escalated from security analysts to senior security analysts to security engineers and finally to the network intelligence and engineering organizations of the MSM service itself. Where customer service issues arise, escalation may proceed from the security analysts to the customer service organization of the MSM service to MSM service and customer management. Where technical support issues arise, escalation may proceed from a security engineer to the network intelligence and engineering organizations of the MSM service to the customer service organization of the MSM service. If necessary, customer service can coordinate with MSM service and customer management to arrange for outsourced field engineering personnel to provide any necessary technical support, including on-site support.

Escalations are primarily intended to prevent open problems from going unrecognized. Escalation procedures should therefore be designed to identify those open problems that may have been overlooked or that require additional attention. Ideally, the number of open problems that satisfy this condition should be relatively low and represent the exception rather than the rule.

Escalations may be of various types, including time-based and event-driven. Time-based escalations can be intended to capture problems that have remained in a particular state beyond a specified period of time. Event-based escalations can be designed to trigger immediately when a predefined condition is met. When escalation criteria are met, workflow procedures can be defined to perform one or more actions. Examples of such actions include:

sending notification of the problem to the appropriate group or individual;
reassigning the problem;
escalating from first level support to second level support to manager of the day;
escalating to upper management;
generating a report for the problem; and
incrementing or decrementing the priority of the problem.

In the case of a time-based escalation, guidelines may be established for the maximum amount of time that a problem can remain unresolved before specific actions are taken. Normally, a solution cannot be guaranteed within a specific time frame but, in a preferred embodiment, support personnel can represent that within a certain amount of time, the problem will either be resolved or escalated by bringing additional resources to bear.

Escalation procedures can help ensure that the time frames for problem resolution are being met and that no problem remains unresolved. These timeframes can be built into the SOCRATES system with predetermined triggers that automatically escalate an incident based on the length of time it goes without valid resolution. For example, escalation in the form of notifying the assigned-to group might be required if a problem remains in an "open" or "assigned" state for longer than 60 minutes.

Operating procedures for the MSM service can also include procedures for handling incoming calls of various types. Possible call types can include incident-related calls, customer service related calls, technical support-related calls and sales related calls. Incident related calls can include customer callbacks due to an existing problem ticket (for example, returning a security analyst's call, calling regarding ticket closure or calling requesting more support on an incident) and customer cold calls (for example, reporting an incident not flagged by the probe/sentry system and sent to the SOC).

Figure 7:
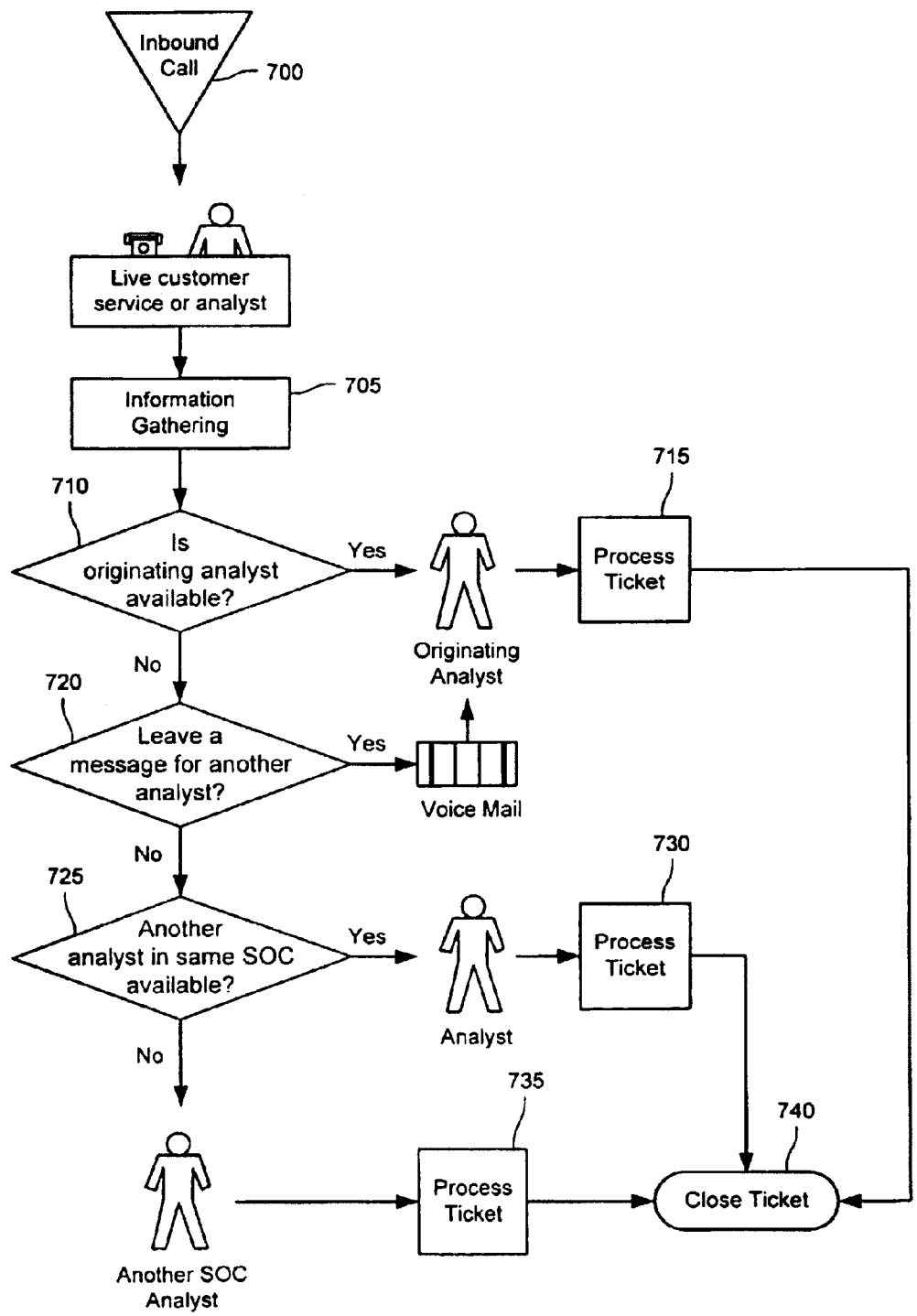
FIG. 7 is a flowchart illustrating an exemplary implementation of a customer call handling procedure for a customer call arising from an existing problem ticket, in an exemplary embodiment of the present invention.

FIG. 7 is a flowchart illustrating an exemplary implementation of a customer call handling procedure for a call arising from an existing problem ticket. In step 700, an incoming call is screened by a customer service representative or an analyst. In one embodiment, incoming calls during business hours could be first answered by a customer service representative, while calls after business hours could be directly routed to security analysts at the SOC. In step 705, the representative or analyst gathers information about the customer and the nature of the call. In step 710, the call is transferred to the analyst who originally responded to the problem ticket, if he or she is available (step 715). If not, the customer may be given a choice to leave a message for the originating analyst or be routed to another available security analyst within the same SOC (step 720). If another analyst is available at the same SOC (step 725), he or she can process the ticket (step 730). Otherwise, the customer can be routed to an analyst at another SOC, who will then process the ticket (step 735). After processing is complete, the ticket is closed (step 740).

Figure 8:
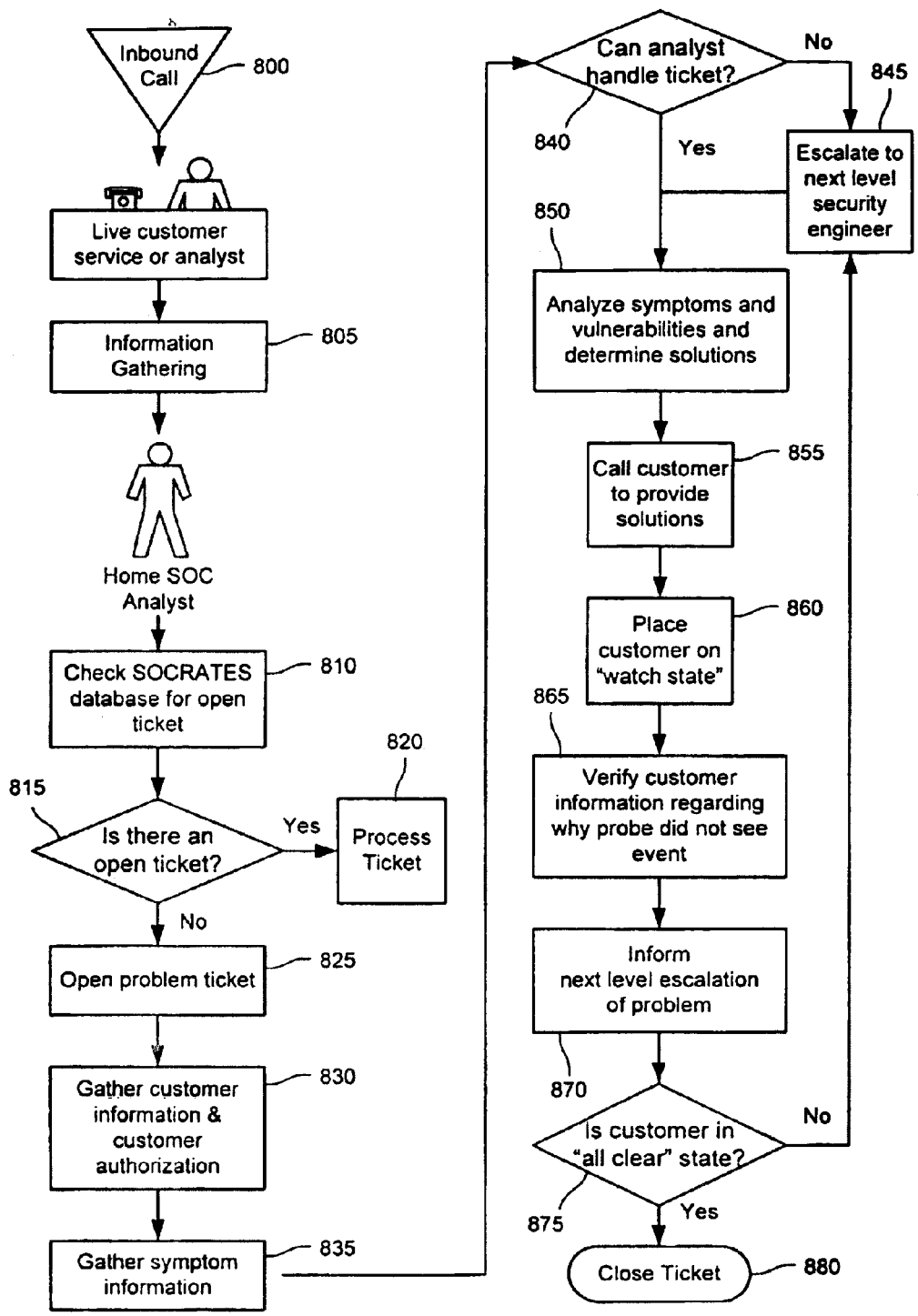
FIG. 8 is a flowchart illustrating an exemplary implementation of a customer call handling procedure for a customer cold call due to something the customer found on the customer's own network, in an exemplary embodiment of the present invention.

FIG. 8 is a flowchart illustrating an exemplary implementation of a customer call handling procedure for a cold call resulting from an event that a customer has found on its own network. In step 800, the call is screened by a customer service representative or analyst, who, in step 805, gathers information about the customer and the nature of the call. In a preferred embodiment, the call is then transferred to the customer's home SOC. If there is no available security analyst in the customer's home SOC, the call may be routed to an available security analyst in another SOC. In step 810, the analyst checks the appropriate SOCRATES database to make sure there are no open or closed tickets for the incident being reported. If there is an open ticket (step 815), the analyst will proceed to process the ticket (step 820). If there are no open or closed tickets pertaining to this incident, the analyst will proceed to open a new ticket (step 825). In step 830, the analyst gathers information from and authenticates the customer. In step 835, the analyst gathers symptom information. In step 840, the analyst determines whether he or she can handle the ticket. If not, the ticket may be escalated to the next level in accordance with FIG. 6, for example, to a security engineer (step 845). In step 850, the analyst (or security engineer) analyzes the ticket and matches symptoms to vulnerabilities to possible solutions. In step 855, the analyst (or security engineer) calls the customer to provide possible solutions, and, in step 860, places the customer in a "watch state." In step 865, the analyst (or security engineer) tries to determine from the information provided by the customer why the probe/sentry system on the customer's site failed to capture the event, and, in step 870, he or she informs the next level escalation of any problem with the functioning of the probe/sentry system. In 875, the analyst (or security engineer) determines whether the solutions provided have solved the problem and whether the customer is now in an "all clear" state. If yes, in step 880, the ticket can be closed.

Customer service related calls can include customer relationship calls (for example, customer complaints, customer comments, and other customer satisfaction related calls), change management calls (for example, requests to change contact information, requests to change filters, requests to add or remove services, requests or notifications regarding movement of equipment and change orders) and information requests (for example, questions regarding current services, report requests, services requests and questions regarding future services). Customer service related calls may be processed similarly to other calls. In an exemplary embodiment, processing of customer service related calls could begin with opening a ticket. Customer service personnel would then gather information from the customer for authentication and then process the ticket according to the customer's needs. If the call required escalation, customer service could escalate the call to the appropriate team or management person best suited to handle the situation. Customer service would then follow up with the team or management person until the situation was resolved. At this point, the ticket could be closed.

Technical support related calls can include (i) customers calling the SOC for general support of their security devices and (ii) customers calling the SOC due to failures in the their networks resulting from solutions provided by the SOC. An exemplary response protocol for the first type of call might be as follows: First, the security analyst opens a ticket, gathers all customer information required, and notes any questions the customer may have. The security analyst then determines if he or she can handle all of the customer's inquiries. If not, the ticket is escalated to a security engineer. The security analyst or security engineer then will answer all of the customer's questions to the best of their ability. If the customer requires in-depth product support of a product not supplied by the MSM service, the security analyst or security engineer can advise the customer to contact the manufacturer of the product for more detailed technical support. At this point, the security analyst or security engineer can proceed to close the ticket.

An exemplary response protocol for the second type of technical support related call might be as follows: Any call from a customer reporting a network failure due to a solution provided by the MSM service can immediately be escalated to a security engineer. The security engineer will help the customer to the best of his or her ability. If the security engineer cannot help the customer over the phone and the customer requires an on-site visit, the ticket is escalated to customer service. Customer service then determines how best to serve the customer. The ticket may require a security engineer to go to the customer's site. Alternatively, the ticket may be referred to a business partner of the MSM service for an on-site visit. When an "all clear" signal is received from the customer, customer service will proceed to close the ticket, prior to which all details about the incident and responses, including any solutions implemented, should be logged into SOCRATES 6000.

Sales related calls can include calls from potential customers inquiring about the MSM service. Such calls may be processed similarly to other calls. In an exemplary embodiment, processing of an incoming sales call could start with opening a ticket. The customer service representative or security analyst should gather information from the new or potential customer and forward it to sales. The security analyst or customer service representative should also log the name of the sales representative and the time and date the call was referred to sales.

Figure 9:
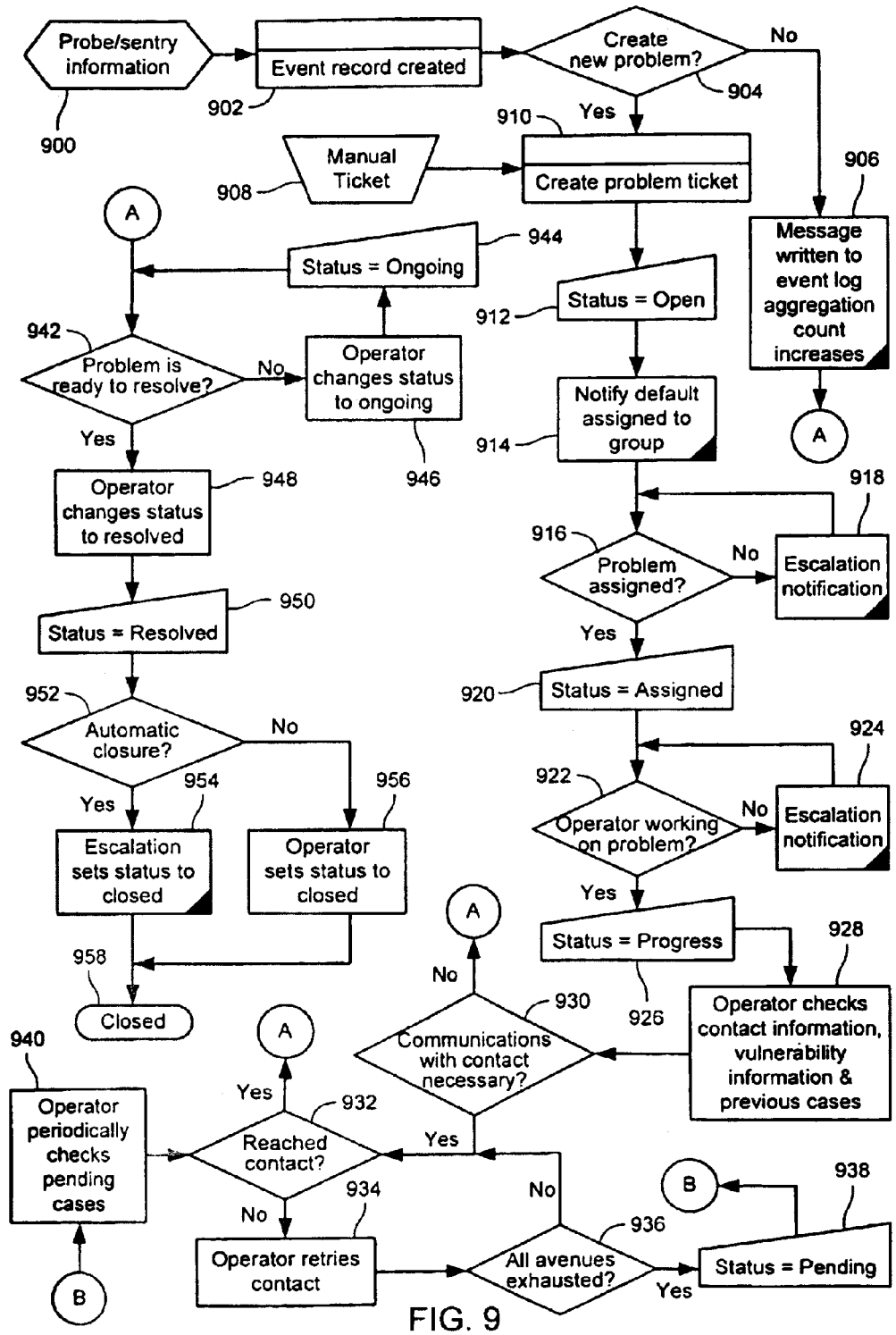
FIG. 9 is a flowchart illustrating an exemplary implementation of a problem workflow in an exemplary embodiment of the present invention.

FIG. 9 is a flowchart illustrating, in greater detail, an exemplary implementation of the problem ticket generation and handling process. In step 900, the probe/sentry sends information about noteworthy events on the customer's network, in the form of sentry messages, to the gateway system at the SOC. Each sentry message is tagged with a sentry identification number ("sentry ID") and a message identification number ("message ID"). Message IDs reflect the nature of events happening on the customer's network, such that substantially identical events (for example, multiple incorrect logins to the same server) will result in identical message IDs.

In step 902, a gateway message or "event record," still tagged with the same sentry ID and message ID, is created by the gateway system at the SOC. In step 904, a decision can be made to create a new problem ticket if the severity of the gateway message/event record is greater than some threshold (for example, "interesting") and the sentry ID and the message ID are different from that of any already opened problem ticket. If the sentry ID and message ID are identical to that of an already opened problem ticket, a message will, in step 906, be written to an event log and the aggregation count associated with the particular problem ticket will be incremented by one.

In step 910, a problem ticket is created. In a preferred embodiment, the majority of problem tickets will be created automatically by SOCRATES 6000 as a result of gateway messages spawned by sentry messages sent from the probe/sentry system. Problem tickets may also be created manually (step 908) by a security analyst or other SOCRATES operator using a SOCRATES form. The status of problem ticket may be set to one of a number of states. Once created, the status of the problem ticket is set to "open" (step 912) and, in step 914, the default assigned-to group is notified. In step 916, if the problem ticket cannot be assigned, an escalation notification is generated, in step 918, and assignment is reattempted. Once assigned, the status of the problem ticket is set, in step 920, to "assigned." In step 922, if the assigned security analyst (or "operator") is not working on the problem, the problem can be escalated, in step 924, until the problem is being worked on, at which point the status is set, in step 926, to "in progress." In step 928, the security analyst checks customer contact information, vulnerability information and previous cases involving similar incidents in a search for possible solutions. In step 930, the security analyst decides whether communication with a customer contact is necessary. If yes, in steps 932, 934 and 936, the security analyst tries to reach the customer contact through various avenues until he or she is successful or all avenues have been exhausted. If all avenues have been exhausted, the ticket status is set, in step 938, to "pending," and the security analyst will check such pending tickets periodically (step 940). If the security analyst is able to reach the customer contact or communication with the customer is unnecessary, problem resolution can continue. The security analyst works on the problem until the problem is ready to resolve (step 942). During this time, the status of the problem ticket is set by the operator or analyst to "ongoing" (steps 944 and 946). Once the problem is ready to resolve, the security analyst changes the status of the problem to "resolved" (steps 948 and 950). In step 952, the ticket is closed, either automatically, by escalation setting the status to "closed" (step 954) or manually, by the security analyst setting the status to "closed" (step 956). In step 958, the ticket is closed.

MODIFICATIONS, ENHANCEMENTS AND ALTERNATE EMBODIMENTS

The foregoing has described various aspects of an exemplary implementation of the present invention, directed at monitoring, detecting and responding to computer network intrusions. Those skilled in the art will realize, however, that the present invention is usable generally for (i) monitoring of any system; (ii) filtering the data from the monitoring for noteworthy events happening in or affecting any system; (iii) alerting human beings to any such noteworthy events; and (iv) providing for a response by human beings to any such alert.

As one example, the present method could be applied to providing security monitoring, detection and response for a residence or business. For example, such a service might monitor alarm or other status data, filter such data for security-related events, alert a human being upon such a security-related event, and provide for a human response to the alert.

Therefore, it is intended that the scope of the invention be limited only by the claims appended below.

Appendix A

Exemplary Pipes Protocol

Message Format

In a preferred embodiment, the Pipes message format should be easy to parse and human readable to the extent possible without interfering with parsing. Each header field can be separated by spaces. Values can be either printable hex (lower case for letters) or alphabetic mnemonics.

A message can consist of a fixed header followed by a body. An exemplary format for the header is as follows:

HHHH—length (printable hex, 4 characters, range 0..nn)
SPACE—one character, hex 0×20
HHHH—revision (printable hex, 4 characters)
SPACE
SSSS—sentry number (printable hex, 4 characters)
SPACE
HHHH—reference number (printable hex, 4 characters)
SPACE
STATUS—status code for each message
SPACE
KMAC value (always "X" for now)
SPACE
XXXX—opcode (4 printable ASCII characters)
SPACE
PAYLOAD—(length) bytes, in printable hex, max 2048 characters less header Example Message "001f 0000 3333 1111 2222 X ALRT 12345678"

Notes

1. All the above fields should have spaces between them.
2. The first four-digit group is the length of everything after it (LENGTH) (the space through the end of "12345678").
3. The second four-digit group is the revision field (REVISION).
4. The third four-digit group is the probe/sentry number, which identifies a particular probe/sentry ("3333" in the example).
5. The fourth four-digit group is the reference number defined by the probe/sentry system (REFNUM)("1111" in the example).
6. The fifth four-digit group is the status number defined by the probe/sentry system (STATUS) ("2222" in the example).
7. The next one-digit field ("X") is the keyed Media Access Control (KMAC) value, if present. If not present, the value should be an "X."
8. The next field is the op code (OPCODE). For filter-related messages, it is always "ALRT."

9. The portion of the message after the space after "ALRT" is content-specific.

Field Descriptions

REVISION—a version number, consisting of a major and a minor value. Minor revisions should be compatible with previous revisions within the same major number range.

LENGTH—the length in characters of the message that follows the header.

REFNUM—a reference number generated by the initiator of the message exchange. For PING and other multi-message exchanges, the REFNUM of the response should match the value in the request.

STATUS—a status code indicating the severity of the message. Messages are sorted in the hold queue according to priority (status codes numerically larger than n are sent first).

KMAC—value 'X' or 32 characters representing a 16 byte keyed MD5 hash of the entire message, including the header, with the KMAC (Keyed MAC) preset to zero.

OPCODE—printable value indicating the message operation code (i.e., "ALRT").

PAYLOAD—the core content of the message.

Sample Payload Descriptions

Alert
Opcode "ALRT"
This message is sent from the probe/sentry to the gateway by the probe/sentry filtering subsystem. An ALRT payload contains (after decoding to binary):
0 . . . last—block of probe/sentry alert data Initial Contact
Opcode "INIT"
This message is sent from the probe/sentry to the gateway when the probe/sentry first connects to the gateway. An INIT payload contains (after decoding to binary):
0 . . . 3—connect type: 0000=normal, 0001=must-be-accepted Initial Contact Ack
Opcode "INAK"
This message is sent from the gateway to the probe/sentry in response to an INIT.
0 . . . 3—response status: 0000=ok/accepted, 0001=go away Note: a "go away" response should not be acceptable if the probe/sentry used the "must be accepted" connect type.

Ping
Opcode "PING"
This message is sent from (either end) to determine if the other end is alive. A PING payload contains (after decoding to binary):
0 . . . last null terminated text data containing memory used, number of alerts sent, etc.

Ping Ack
Opcode "PACK"
This message is sent in response to a PING. A PACK payload contains (after decoding to binary):
0 . . . 3—first four bytes of PING message.

Test
Opcode "TEST"
This message is sent from (either end) to respond to a test message. A TEST payload contains (after decoding to binary):
0 . . . last test data Test Ack
Opcode "TSAK"
This message is sent from (either end) to respond to a test message. A TSAK payload contains (after decoding to binary):
0 . . . 3 first four bytes of the test message Update Execute
Opcode "UPEX"
This message is sent from the gateway to the probe/sentry to cause an update to be executed. A UPEX payload contains (after decoding to binary):
0 . . . last null terminated ASCII path, from root, of shell script to execute to force update Update Execute Ack
Opcode "EXAK"
This message is sent from the probe/sentry to the gateway to acknowledge a UPEX message. An EXAK payload contains (after decoding to binary):
0 . . . 3 network byte order return code from script.

Update Fragment
Opcode "UFRG"
This message is sent from the gateway to the probe/sentry to send an update. An "update" is a file that may be stored in a directory such as "/MSM/update/<id>", where "id" is the id value from the message. A UFRG payload contains (after decoding to binary):
0 . . . 3—network byte order offset within update
4 . . . 7—ID of update
8 . . . last—contents of update fragment Update Fragment Ack
Opcode "UFAK"
This message is sent from the probe/sentry to the gateway to acknowledge a UFRG message. A UFAK payload contains (after decoding to binary):
0 . . . 3 network byte order offset of last byte of update received.

Appendix B

The configuration details of one possible production environment for the SOCRATES system are as follows:

| AR System Details | |
|---|---|
| AR System Version: | 4.03 |
| AR Client Version: | 4.03 |
| AR Admin Version: | 4.03 |
| H/W Platform Details | |
| Hardware: | Sun Ultra Enterprise 450 |
| Operating System: | Solaris 7.0 |
| Hard disk space: | 256 GB |
| Memory: | 1 GB |
| Disk Configuration: | RAID 5 or RAID 10 (to be determined) |
| # CPU's: | 2 × 400 mhz |
| Database Details | |
| Vendor: | Oracle 8.x |
| Allocated Disk Space: | To be determined |
| Client Details | |
| Operating System: | NT 4.0 Workstation |
| Monitor Resolution: | 1024 × 768 |

The configuration details of one possible development environment for the SOCRATES system are listed below:

| AR System Details | |
|---|---|
| AR System Version: | 4.03 |
| AR Client Version: | 4.03 |
| AR Admin Version: | 4.03 |
| H/W Platform Details | |
| Hardware: | Sun Ultra 10 Workstation |
| Operating System: | Solaris 7.0 |
| Hard disk space: | 9 GB |
| Memory: | 1 GB |
| Disk Configuration: | To be determined |
| # CPU's: | 1 440 mhz |
| Database Details | |
| Vendor: | Oracle 8.x |
| Allocated Disk Space: | To be determined |

Appendix C

This appendix describes data categories and functionalities that may be employed in an exemplary embodiment of the SOCRATES system. Additional data categories are possible. Such data elements can be stored in forms, tables or other formats.

The tables provided in this appendix are organized as follows:

TABLE 1 Summary of data categories

TABLES 2–19 Summary of fields included in each data category described in TABLE 1

TABLES 20–26 Types of active links, filters, macros, notifications, etc.

In TABLES 2–19, the "field type" columns correspond to field types commonly employed in programming languages like C, Java, or Fortran.

TABLE 1

Data Categories

| Data Category (TABLE #) | Description |
|---|---|
| Change Request (2) | A request to make a change, including suggesting a new feature, changing an existing function, reporting a bug, or changing data. |
| Company (3) | Information about a company. |
| Contacts (4) | A matrix of Persons used to decide whom to contact and under what circumstances. |
| Diagnosis (5) | The end result of the problem resolution process, for example an attack or a normal operating procedure that created warnings. |
| Gateway Message (6) | A received Message describing what happened. |
| Install (7) | An installed device monitored by the MSM service. |
| Message (8) | A type of Message that a gateway may send. |
| Person (9) | Information about a person. |
| Problem Ticket (10) | A consolidation of information regarding a specific set of happenings that may indicate an attack, such information including gateway messages, company information and security intelligence information. |

TABLE 1-continued

Data Categories

| Data Category (TABLE #) | Description |
|---|---|
| SecurityFocusVulnerability (11) | Information about system vulnerabilities, which may be a combination of custom information and information provided by a commercial provider such as SecurityFocus.com. |
| Symptom (12) | An in-depth description of a Message. Many different Messages may indicate the same Symptom. |
| SymptomToDiagnosis (13) | Links Symptoms to Diagnoses. |
| SymToTechnology (14) | Links Symptoms to affected Technologies. |
| Technology (15) | An operating system, software product or hardware product that may play a role in security. |
| TimeZone (16) | A representation, which may be text, of a particular time zone. The representation may be expressed as a number of hours representing the difference from GMT. |
| Vulnerability (17) | An exploitable weakness in a Technology. |
| VulnerabilityToDiagnosis (18) | Links Vulnerabilities to Diagnoses. |
| VulnToTechnology (19) | Links Vulnerabilities to affected Technologies. |

TABLE 2

SOC: Change Request

| Name | Field Type | Description |
|---|---|---|
| Status | Radio Button | Possible states include: New, Assigned, Fixed, Rejected, Closed. |
| Request Type | Radio Button | Possible states include: Suggestion, Change Function, Bug, Required Missing Function, Data Request. |
| Brief Description | Char 64 | A brief description of the request. |
| From, FromPersonName | Char 15, Char 155 | Full name from Person record of person who made the request. |
| Responsible, ResponsiblePersonName | Char 15, Char 155 | Full name from Person record of person who should administrate or be responsible for the request. |
| Priority | Radio Button | Possible states include: High, Medium, Low, Implement if Time Allows. |
| Memo | Diary | A discussion of the problem. |
| Attachments | Attachment | Attached files relating to the problem |

TABLE 3

SOC: Company

| Name | Field Type | Description |
|---|---|---|
| CompanyID | Char 15 | Unique ID for the Company. |
| Company Name | Char 128 | Name of the Company. |
| Work Phone | Char 30 | Telephone number for the front desk. |
| Fax | Char 30 | Main Company fax number. |
| WebSite | Char 255 | Corporate home page. |
| Area Code | Char 10 | Area Code used for geographic location. |
| ContactID | Char 40 | Pointer to the Company Contacts record. |

TABLE 3-continued

SOC: Company

| Name | Field Type | Description |
| --- | --- | --- |
| TimeZone Desc | Char 255 | Character description of the Time Zone. |
| Time Zone | Real | Numeric offset from GMT. |
| Region | Char 30 | Company defined region. |
| Site | Char 30 | Company defined site. |
| P.O. Box | Char 10 | Post office box number. |
| Street Number | Char 10 | Street number. |
| Street Name | Char 65 | Street name. |
| Other Street Info | Char 65 | Address information other than Street Name and Street Number, for example, "100 Plaza East." |
| City | Char 65 | City. |
| Country | Char 65 | Country. |
| Zip Code | Char 30 | Zip or postal code. |
| Mailing Address | Char 300 | Mailing address exactly as written on a post envelope. |
| Memo | Diary | Pertinent notes for this record. |
| Attachments | Attachment | Pertinent file attachments for this record. |

TABLE 4

SOC: Contacts

| Name | Field Type | Description |
| --- | --- | --- |
| Contacts Unique ID | Char 40 | Unique ID for the Contact |
| Description1–10 | Char 60 | Ten descriptions representing 10 different contact events. Each contact event can have, for example, 3 contacts and 3 contact methods. |
| Contact | Drop-Down List | Either or Both. Indicates whether more than one contact must be contacted. |
| ContactIDA1–B10 | Char 15, | Full name of the Contact Person. |
| ContactA1–B10 | Char 155 | |
| MethodA1–B10 | Drop-Down List | Method of communicating with Contact, including Phone, Page and E-mail. |
| Memo | Diary | Pertinent notes for this record. |
| Attachments | Attachment | Pertinent file attachments for this record. |

TABLE 5

SOC: Diagnosis

| Name | Field Type | Description |
| --- | --- | --- |
| Diagnosis ID | Char 15 | Unique identifier for this record. |
| Type | Radio Button | Operational Procedure, Attack, Configuration. |
| Name | Char 60 | Name of particular diagnosis. |
| DocumentationStatus | Drop-Down List | Possible states include: Named, Summarized, Described, Reviewed by NI(1), Reviewed by Technical Writer, Reviewed NI(2), Approved. |
| Summary | Char 0 | A summary description of the diagnosis which can used in an initial communication to the customer. The description can be somewhat of a "scripted" response the analyst can provide to the customer. |
| Impact | Char 500 | A brief description of the impact the diagnosis has on the customer. |
| Description | Char 0 | A detailed description and discussion of the diagnosis. |

TABLE 5-continued

SOC: Diagnosis

| Name | Field Type | Description |
| --- | --- | --- |
| Severity For Unknown Victim For Known Victim For Mission Critical Victim | Drop-Down List | Possible states include: Critical, Suspicious, Relevant, Interesting and Not Defined. Indicates severity for each category of installed device. |
| Recommendations | Char 0 | Recommended courses of action. This can be broken out into more structured data. |
| Memo | Diary | Pertinent notes for this record. |
| Confirmation | Char 0 | What procedures could be done to confirm this is a correct diagnosis. |
| CounterEvidence | Char 0 | What procedures could be done to confirm this is not the correct diagnosis. |
| Attachments | Attachment | Pertinent file attachments for this record. |

TABLE 6

SOC: Gateway Message

| Name | Field Type | Description |
| --- | --- | --- |
| GatewayMessageID | Char 15 | Unique identifier for this record. |
| Company ID | Char 15 | Pointer into the Company table. |
| Company Name | Char 128 | Name of the Company responsible for the probe/sentry that sent the initiating sentry message. |
| Attacker IP | Char 25 | IP address of the device that invoked this attack. |
| Vcategory | Drop Down | Category of the Victim device. |
| Victim IP | Char 25 | IP address of the Victim device. |
| Victim ID | Char 45 | Pointer into the Install Table for the Victim device. |
| Sensor IP | Char 25 | IP address of the Sensor device that alerted the probe/sentry (e.g., firewall, IDS, etc.). |
| Sensor ID | Char 45 | Pointer into the Install Table for the Sensor. |
| Sentry IP | Char 25 | IP address of the probe/sentry that monitored the Sensor. |
| Sentry ID | Char 45 | Pointer into the Install Table for the Sentry |
| Problem ID | Char 15 | Pointer into the Problem Ticket Table for the Problem Ticket generated because of this Gateway Message. |
| Short Message | Char 255 | Message text sent by the Sentry. |
| Long Message | Char 0 | Message text sent by the Sentry. |
| Message ID | Char 45 | Pointer into the Message Table indicating the type of message sent. |
| SymptomID | Char 45 | The Symptom linked to by the Message ID. |
| Symptom Name | Char 128 | The name of the above Symptom. |
| Severity | Drop-Down List | Possible states include: Critical, Suspicious, Relevant, Interesting and Not Identified. May be derived from Symptom and Vcategory. |
| Sentry Hardware, Product, and OS | Char 255 | Information regarding Sentry. Can be taken from the Install record pointed to by Sentry ID. |
| Sensor Hardware, Product, and OS | Char 255 | Information regarding Sensor. Can be taken from the Install record pointed to by Sensor ID. |
| Victim Hardware, Product, and OS | Char 255 | Information regarding Victim. Can be taken from the Install record pointed to by Victim ID. |
| Desc1, Value1, Desc2, Value2, Desc3, Value3 | Char 64, Char 255 | Generic parameters sent by the probe/sentry. |

TABLE 6-continued

SOC: Gateway Message

| Name | Field Type | Description |
|---|---|---|
| Attack Time | Date/Time | Timestamp of when the attack occurred. |
| Attack uTime | Decimal | Unix representation of the above time. |
| Sensor Time | Date/Time | Timestamp of when the sensor reported the attack. |
| Sensor uTime | Decimal | Unix representation of the above time. |
| Gateway Time | Date/Time | Timestamp of when the gateway reported the attack. |
| Sensor uTime | Decimal | Unix representation of the above time. |
| Grouped Messages | Radio Button | Yes or No. Indicates if this Message is one of a group of several messages of the same type. |
| Group Count Start, Group Count uTime | Date/Time, Decimal | When the probe/sentry started counting the messages in this group. |
| Group Count Duration | Decimal | How long (in, for example, milliseconds) the probe/sentry counted the messages in this group. |
| Message Count | Integer | How many messages the probe/sentry counted in this group. |

TABLE 7

SOC: Install

| Name | Field Type | Description |
|---|---|---|
| Company ID | Char 15 | Pointer into the Company Table indicating the company that is being monitored. |
| Company Name | Char 128 | Name of the Company. |
| Tag Number | Char 45 | Unique identifier for particular device. |
| HardwareID, HardwareName | Char 15, Char 255 | Pointer into Technology table representing the Hardware for this device. |
| ProductID, ProductName | Char 15, Char 255 | Pointer into Technology table representing the Product for this device. |
| OSID, OSName | Char 15, Char 255 | Pointer into Technology table representing the Operating System for this device. |
| Status | Drop-Down List | Possible states include: Ordered, Received, Being Assembled, Deployed, In Repair, Down, End of Life, Transferred, Delete, In Inventory, On Loan, Disposed. |
| Supported | Radio Button | Yes or No. Indicates whether the MSM service supports this device. For probe/sentries this normally can be Yes; for Installs that point to probe/sentries this normally can be No. |
| Sentry | Radio Button | Yes or No. Indicates whether or not this Install is a probe/sentry. |
| Device IP | Char 25 | The IP address of this device. |
| Sentry ID | Char 45 | The Tag Number of the probe/sentry that this Device points to. May be left blank if this Install is a probe/sentry. |
| Machine Name | Char 64 | Name of the particular device. |
| Machine Category | Drop-Down List | Category of device, including Unknown, Known, and Mission Critical. |
| Contact ID, Contact Name | Char 15, Char 40 | Pointer into the SOC:Contacts table for the contact matrix. |
| Received Date, Returned Date, Available Date, Installed Date | Date/Time | A series of dates that can record the life of the Install. |

TABLE 7-continued

SOC: Install

| Name | Field Type | Description |
|---|---|---|
| CPU Serial Number, Monitor Serial Number | Char 64 | Vendor identifying numbers. |
| Accessories | Char 128 | A description of peripherals installed. |
| Installer | Char 155 | The full name of the person that installed this device. |
| Owner | Char 155 | The full name of the person that owns this device. |
| Department, Floor, Room, Cage | Char 65 | Identifying the location of the Installed device. |
| Use Company Location | Radio Button | Yes or No. Indicates whether or not to use the company location information stored in the Company record. |
| TimeZone Desc | Char 255 | Character Description of the Time Zone. |
| Time Zone | Real | Numeric offset from GMT. |
| Region | Char 30 | Company defined region. |
| Site | Char 30 | Company defined site. |
| P.O. Box | Char 10 | Post office box number. |
| Street Number | Char 10 | Street number. |
| Street Name | Char 65 | Street name. |
| Other Street Info | Char 65 | Address information other than Street Name and Number (e.g., 100 Plaza East). |
| City | Char 65 | City. |
| Country | Char 65 | Country. |
| Zip Code | Char 30 | Zip or postal code. |
| Mailing Address | Char 300 | The mailing address exactly as written on a post envelope. |
| Router Address, Subnet Mask, Ethernet Address, NATIP, SSH Port, Public Key, BIOS Password, Root Password, Other Password | Char | Specific information about this Install. |
| Memo | Diary | Pertinent notes for this record. |
| Attachments | Attachment | Pertinent file attachments for this record. |

TABLE 8

SOC: Message

| Name | Field Type | Description |
|---|---|---|
| Message ID | Char 45 | Sentry group defined identifier for a message. |
| Symptom ID | Char 45 | Pointer to the Symptom table. |
| Name | Char 255 | Name of the message. |
| Service | Char 30 | Service to which this message pertains. |
| Type | Drop-Down List | Type of message, including Drop, Forensic, Report, Alert. |
| Description | Char 255 | Description of message. |
| Pattern(s) | Char 0 | The actual filter pattern(s). Each filter pattern can be separated by a new line. |
| Memo | Diary | Pertinent notes for this record. |

TABLE 9

SOC: Person

| Name | Field Type | Description |
|---|---|---|
| PersonID | Char 15 | Unique identifier for this person. |
| CompanyID | Char 15 | Pointer into the Company table. |
| Company Name | Char 128 | Name of the above Company. |

TABLE 9-continued

SOC: Person

| Name | Field Type | Description |
| --- | --- | --- |
| Last Name | Char 65 | Last name. |
| First Name | Char 65 | First name. |
| MI | Char 5 | Middle initial. |
| Full Name | Char 155 | The full name of this person in a particular format (e.g., first name first). |
| Courtesy Title | Drop-Down List | Possible states include: Mr., Ms., Mrs., Miss. or Dr. |
| Title | Char 50 | The person's job title (e.g., on the person's business card). |
| Level | Radio Button | Possible states include: Officer, VP, Director, Manager, Supervisor, Technician, Other. |
| Works in Support | Radio Button | Yes, No. |
| Work Phone, Work Phone2, Fax, Fax2, Mobile Phone, Home Phone | Char 30 | Phone numbers that could be used to contact this person. |
| Email | Char 255 | Email address of this person. |
| CC:Email | Char 255 | Email address(es) of those to CC when emailing this person. |
| Area Code | Char 10 | Geographically identifies where this person is located. |
| Pager Phone, Pager Email, Pager Pin, Pager Provider | Char | Pager information. |
| Department, Floor, Room | Char 65 | Location of this person. |
| Use Company Location | Radio Button | Yes or No. Indicates whether or not to use the location stored in the Company record. |
| TimeZone Desc | Char 255 | Character description of the Time Zone. |
| Time Zone | Real | Numeric offset from GMT. |
| Region | Char 30 | Company defined region. |
| Site | Char 30 | Company defined site. |
| P.O. Box | Char 10 | Post office box number. |
| Street Number | Char 10 | Street number. |
| Street Name | Char 65 | Street name. |
| Other Street Info | Char 65 | Address information other than Street Name and Number (e.g., 100 Plaza East). |
| City | Char 65 | City. |
| Country | Char 65 | Country. |
| Zip Code | Char 30 | Zip or postal code. |
| Mailing Address | Char 300 | Mailing address exactly as written on a post envelope. |
| Memo | Diary | Pertinent notes for this record. |
| Attachments | Attachment | Pertinent file attachments for this record. |

TABLE 10

SOC: Problem Ticket

| Name | Field Type | Description |
| --- | --- | --- |
| Problem ID | Char 15 | Unique identifier for this record. |
| Status | Drop-Down List | Possible states include: Open, Assigned, In Progress, Pending, Ongoing, Resolved, Consolidated, Closed. |
| CompanyID | Char 15 | Pointer into the Company table. |
| Company Name | Char 128 | Name of the above Company. |
| Priority | Char 2 | An identifier indicating what to work on first. |
| Pending Reason | Drop-Down List | Possible states: Waiting for Customer Callback, Problem is Being Monitored, Collecting Report Data, Reoccuring Normal Function. |
| Source | Drop-Down List | Possible values: Gateway, Operator, Customer. |
| Caller, Caller Name | Char 15, Char 155 | Full Name of the person who called. A record should also be made in Person. |
| Assigned Operator, AssignedOperatorName | Char 15, Char 155 | Full name of the analyst assigned to this problem. |
| Sentry ID | Char 45 | Pointer to the Install record for the probe/sentry that reported this problem. |
| Sentry IP | Char 25 | IP address of the above probe/sentry |
| Linked Gateway Messages | Table | A table of all Gateway Messages linked to this problem. |
| 1st Symptom ID | Char 45 | Pointer into the Symptom table to the most relevant Symptom. |
| 1st Symptom Name | Char 65 | Name of the above Symptom |
| Diagnoses with the above symptom | Table | A table of all Diagnoses that are linked to 1st Symptom ID. |
| Diagnosis ID | Char 15 | Pointer into the Diagnosis table to proposed Diagnosis. |
| Diagnosis Name | Char 60 | Name of the above Diagnosis. |
| Symptoms of this Diagnosis | Table | A table of all symptoms linked to the Diagnosis ID. |
| Attack Time | Date/Time | Timestamp of when the attack occurred |
| Sensor Time | Date/Time | Timestamp of when the sensor reported the attack |
| Gateway Time | Date/Time | Timestamp of when the gateway reported the attack |
| Create Time | Date/Time | Timestamp of when the problem ticket was created |
| Resolved Time | Date/Time | Timestamp of when the problem ticket was resolved |
| Sentry Delta, Gateway Delta, Create Delta, Resolved Delta | Integer | The number of seconds between two consecutive timestamps. Useful to identify lags in the process. |
| Department, Floor, Room, Cage, Region, Site, Street Number, Street Name, Other Street Info, City, State, Country, Zip Code, Hardware, Product, OS | Char | Can be copied from the probe/sentry record. |
| Memo | Diary | Pertinent notes for this record. |
| Attachments | Attachment | Pertinent file attachments for this record. |

TABLE 11

SOC: SecurityFocusVulnerability

| Name | Field Type | Description |
| --- | --- | --- |
| Name | Char 255 | Name of the Vulnerability. |
| LinksToVulnerability | Char 40 | Pointer into the Vulnerability table. |
| LinksToVulnName | Char 255 | Name of the above Vulnerability. |
| Bugtraq id | Char 255 | SecurityFocus.com defined unique identifier for this Vulnerability. |

TABLE 11-continued

SOC: SecurityFocusVulnerability

| Name | Field Type | Description |
| --- | --- | --- |
| Object, Class, cve, published, updated, remote, local, Vulnerable, Not Vulnerable, Credit, Discussion, Exploit, Reference, Solution | Char | SecurityFocus.com defined information fields as described in http://www.securityfocus. |
| Memo | Diary | Pertinent notes for this record. |
| Attachments | Attachment | Pertinent file attachments for this record. |

TABLE 12

SOC: Symptom

| Name | Field Type | Description |
| --- | --- | --- |
| SymptomID | Char 45 | Unique identifier for this record. |
| Name | Char 128 | Name of this Symptom. |
| Severity For Unknown Victim For Known Victim For Mission Critical Victim | Drop-Down List | Possible values: Critical, Suspicious, Relevant, Interesting and Not Defined. Indicates severity for each category of installed device. |
| Description | Char 255 | A lengthy description of this Symptom |
| Memo | Diary | Pertinent notes for this record. |
| Attachments | Attachment | Pertinent file attachments for this record. |

TABLE 13

SOC: SymptomToDiagnosis

| Name | Field Type | Description |
| --- | --- | --- |
| ID | Char 15 | Unique identifier for the record. |
| Symptom ID | Char 40 | Pointer to the Symptom record. |
| Symptom Name | Char 255 | Name of the Symptom. |
| Diagnosis ID | Char 15 | Pointer to the Diagnosis record. |
| Diagnosis Name | Char 255 | Name of the Diagnosis. |
| Closeness | Drop-Down List | Possible values: Definitely Not Connected, Might Be Connected, Likely Connected, Connected, Definitely Connected. |

TABLE 14

SOC:SymToTechnology

| Name | Field Type | Description |
| --- | --- | --- |
| Symptom ID, Symptom Name | Char 40, Char 255 | Pointer to the Symptom record. |
| Technology ID Technology Name | Char 15, Char 255 | The name of the Technology to which this Symptom is linked. |
| Relationship | Drop-Down List | Possible values: Confirmed Unrelated, "Low" Relationship, "Medium" Relationship, "High" Relationship, Confirmed Relationship. |

TABLE 15

SOC:Technology

| Name | Field Type | Description |
| --- | --- | --- |
| Technology ID | Char 15 | Unique identifier for this record. |
| Category 1 | Char 126 | Indicates most general level of categorization (e.g., hardware or software). |
| Category 2 | Char 126 | Next category level (e.g., operating system, firewall, etc.). |
| Category 3 | Char 126 | Vendor and product (e.g., Microsoft Windows NT). |
| Category 4 | Char 126 | Version number (e.g., 4.0). |
| Category 5 | Char 126 | Service pack (e.g., SP5). |
| Name | Char 255 | Can be a concatenation of Categories 3, 4, and 5. |
| VendorID, VendorName | Char 15, Char 128 | Pointer to Company table indicating the vendor of this Technology. |
| Product Number, Description, Supplier Name, Manufacturer Name | Char | Recent information regarding how this Technology was purchased. |
| Memo | Diary | Pertinent notes for this record. |
| Attachments | Attachment | Pertinent file attachments for this record. |

TABLE 16

SOC:TimeZone

| Name | Field Type | Description |
| --- | --- | --- |
| Name | Char 60 | Text description of the time zone. |
| Value | Real | Hours difference from GMT. |

TABLE 17

SOC:Vulnerability

| Name | Field Type | Description |
| --- | --- | --- |
| Vulnerability ID | Char 40 | Unique identifier for this Vulnerability. |
| Name | Char 80 | Full name of the Vulnerability. |
| Summary | Char 0 | Summary description of the Vulnerability. |
| Description | Char 0 | Detailed technical description of the Vulnerability. |
| Affected Technologies | Char 0 | A listing of affected Technologies and configurations. This data can be additionally structured. |
| Memo | Diary | Pertinent notes for this record. |
| Attachments | Attachment | Pertinent file attachments for this record. |

TABLE 18

SOC:VulnerabilityToDiagnosis

| Name | Field Type | Description |
| --- | --- | --- |
| ID | Char 15 | Unique identifier for the record. |
| Vulnerability ID | Char 40 | Pointer to the Vulnerability record. |
| Vulnerability Name | Char 255 | Name of the Vulnerability. |
| Diagnosis ID | Char 15 | Pointer to the Diagnosis record. |
| Diagnosis Name | Char 255 | Name of the Diagnosis. |

TABLE 19

SOC:VulnToTechnology

| Name | Field Type | Description |
|---|---|---|
| Vulnerability ID, Vulnerability Name | Char 30, Char 255 | Pointer to the Vulnerability record. |
| Technology ID, Technology Name | Char 15, Char 255 | Pointer to the Technology record. |
| Relationship | Drop-Down List | Possible values: Confirmed Unrelated, "Low" Relationship, "Medium" Relationship, "High" Relationship, Confirmed Relationship. |

TABLE 20

Active Links

| Name | Description |
|---|---|
| SOC:CIPersonNameA1-CIPersonNameB10 | Retrieves a person's name based on ID. |
| SOC:CIPushA1-CIPushB10 | Displays a highlighted contact's personal information at the bottom of the SOC:Contacts form. |
| SOC:COContacts | Runs the SOC:FindContacts macro when the Contacts button is pushed on the SOC:Company form. |
| SOC:COContactsName | Retrieves a contact's name based on ID. |
| SOC:COGenerateMailingAddress | Concatenates Address, City, State, Country and Zip information into the Mailing Address field when the Generate Mailing Address button is pushed on the SOC:Company form. |
| SOC:COTimeZone | Looks up a TimeZone value when a TimeZone name is selected on the SOC:Company form. |
| SOC:CTDisplayPersonRecord | Runs the SOC:FindPerson macro when the GoTo the Full Person Record button is pushed on the SOC:Contacts form. |
| SOC:CRResponsiblePersonName | Retrieves the person's name based on ID. |
| SOC:CRUpdateFrom | Retrieves the person's name based on ID. |
| SOC:DTDisplayPersonRecord | Runs the Display Person Record macro. |
| SOC:INCompanyID | Looks up the CompanyID when a Company Name is selected on the SOC:Install form. |
| SOC:INContacts | Runs the SOC:FindContacts macro when the Contacts button is pushed on the SOC:Install form. |
| SOC:INContactsName | Retrieves the contact's name based on ID. |
| SOC:INCopyCompanyLocation | Copies Company information into the SOC:Install form when the Copy Company Info button is pushed. |
| SOC:INGenerateMailingAddress | Concatenates Address, City, State, Country and Zip information into the Mailing Address field when the Generate Mailing Address button is pushed on the SOC:Install form. |
| SOC:INHardwareName, SOC:INOSName, SOC:INProductName | Retrieves the Install's name based on ID. |
| SOC:INTimeZone | Looks up a TimeZone value when a TimeZone name is selected on the SOC:Install form. |
| SOC:INUseCompanyLocation | Changes fields from read only to read write (and vice versa) when the Use Company Location radio button is selected on the SOC:Install form. |
| SOC:IPAssignedEngineerPerson | Retrieves the person's name based on ID. |
| SOC:IPCallerPersonName | Retrieves the person's name based on ID. |
| SOC:PECompanyID | Looks up the CompanyID when a Company Name is selected on the SOC:Person form. |
| SOC:PECopyCompanyLocation | Copies Company information into the SOC:Person form when the Copy Company Info button is pushed. |
| SOC:PEGenerateFullName | Concatenates First Name, Middle Initial and Last Name into the Full Name field when the Generate Full Name button is pushed on the SOC:Person form. |
| SOC:PEGenerateMailingAddress | Concatenates Address, City, State, Country and Zip information into the Mailing Address field with the Generate Mailing Address button is pushed on the SOC:Problem Ticket form. |

TABLE 20-continued

Active Links

| Name | Description |
| --- | --- |
| SOC:PETimeZone | Looks up a TimeZone value when a TimeZone name is selected on the SOC:Person form. |
| SOC:PRAssignedOperatorPerson | Retrieves the person's name based on ID. |
| SOC:PRCallerPersonName | Retrieves the person's name based on ID. |
| SOC:PRCreateDelta | Calculates Create Delta when Create Time changes on the SOC:Problem Ticket form. |
| SOC:PRCreateDelta2 | Calculates Create Delta when Gateway Time changes on the SOC:Problem Ticket form. |
| SOC:PRDiagnosisName | Looks up the Diagnosis ID when a Diagnosis Name is selected on the SOC:Problem Ticket form. |
| SOC:PRFillSentryInfo | Sets the Sentry Location fields by looking up Sentry ID on Install. |
| SOC:PRFillSentryInfo10 | Runs the clearflag macro so that the user is not prompted to save data when the user initially displays data. |
| SOC:PRFindCompany | Runs the SOC:FindCompany macro when the Company button is pushed on the SOC:Problem Ticket form. |
| SOC:PRFindContacts | Runs the SOC:FindContacts macro when the Contacts button is pushed on the SOC:Problem Ticket form. |
| SOC:PRFindSentry | Runs the SOC:FindInstall macro when the Sentry button is pushed on the SOC:Problem Ticket form. |
| SOC:PRGatewayDelta | Calculates Gateway Delta when Sensor Time changes on the SOC:Problem Ticket form. |
| SOC:PRGatewayDelta2 | Calculates Gateway Delta when the Gateway Time changes on the SOC:Problem Ticket form. |
| SOC:PRResolvedDelta | Calculates Resolved Delta when Create Time changes on the SOC:Problem Ticket form. |
| SOC:PRResolvedDelta2 | Calculates Resolved Delta when Resolved Time changes on the SOC:Problem Ticket form. |
| SOC:PRSensorDelta | Calculates Sensor Delta when Sensor Time changes on the SOC:Problem Ticket form. |
| SOC:PRSensorDelta2 | Calculates Sensor Delta when Sensor Time changes on the SOC:Problem Ticket form. |
| SOC:PRSymptomName | Looks up the Symptom ID when the Symptom Name is selected from a menu. |
| SOC:SDDiagnosisName | Looks up the Diagnosis ID when the Diagnosis Name is selected from a menu. |
| SOC:SDSymptomName | Looks up the Symptom ID when the Symptom Name is selected from a menu. |
| SOC:SFVulnName | Looks up the VulnID when the Vulnerability Name is selected from a menu. |
| SOC:STSymptomName | Looks up the Symptom ID when the Symptom Name is selected from a menu. |
| SOC:STTechnologyName | Retrieves the Technology's name based on ID. |
| SOC:TOGenerateToolNameFromCat | Concatenates Categories 3, 4, and 5 into the Technology Name field in the SOC:Technology form. |
| SOC:TORtnOnCat1 | Creates the Category 2 menu based on the result of the Category 1 menu. |
| SOC:TORtnOnCat2 | Creates the Category 3 menu based on the result of the Category 2 menu. |
| SOC:TORtnOnCat3 | Creates the Category 4 menu based on the result of the Category 3 menu. |
| SOC:TORtnOnCat4 | Creates the Category 5 menu based on the result of the Category 4 menu. |
| SOC:VDDiagnosisName | Looks up the Diagnosis ID when a Diagnosis Name is selected from a menu. |
| SOC:VDVulnerabilityName | Looks up the VulnID when the Vulnerability Name is selected from a menu. |
| SOC:VTTechnologName | Retrieves the technology's name based on ID. |
| SOC:VTVulnName | Looks up the VulnID when the Vulnerability Name is selected from a menu. |
| SOC:VUFindSecurityFocusVuln | Runs the FindSecurityFocusVulnerabilty macro when the Info from SecurityFocus button is pushed. |

TABLE 21

Filters

| Name | Description |
|---|---|
| SOC:GMSubmitEvent 10–50 | A series of filters that extracts information for a SOC:GatewayMessage record and creates a new SOC:Problem Ticket. |
| SOC:PRAuditLog | Provides a record of all field values each time a SOC:Problem Ticket is modified. |
| SOC:PRFillLastMemo | Fills in a character field with the last typed in memo from the memo field in SOC:Problem Ticket. |
| SOC:PRSetSentryEvent ProblemID | Sets the ProblemID field in SOC:GatewayMessage whenever a GatewayMessage creates a new Problem ID. |

TABLE 22

Macros

| Name | Description |
|---|---|
| SOC:FindContacts | Runs a search on SOC:Contacts for all entries matching an input ContactID. |
| SOC:FindPerson | Runs a search of SOC:Person for all entries matching an input PersonID. |
| clearflag | Clears the change flag for the current form. |
| SOC:FindCompany | Runs a search on SOC:Company for all entries matching an input CompanyID. |
| SOC:FindInstall | Runs a search on SOC:Install for all entries matching an input Tag Number. |
| FindSecurityFocus Vulnerabilty | Runs a search on SOC:SecurityFocusVulnerability for all entries matching an input bugtraqid. |

TABLE 23

Menus

| Name | Description |
|---|---|
| SOC:Category1 | A list of categories describing this level of a specific Technology. |
| SOC:Category2 | A list of categories describing this level of a specific Technology. |
| SOC:Category3 | A list of categories describing this level of a specific Technology. |
| SOC:Category4 | A list of categories describing this level of a specific Technology. |
| SOC:Category5 | A list of categories describing this level of a specific Technology. |
| SOC:Company | A list of Companies that return a Company Name when selected. |
| SOC:CompanyID | A list of Companies that return a Company ID when selected. |
| SOC:Contacts | A list of Contacts. |
| SOC:Diagnosis | A list of Diagnoses. |
| SOC:Hardware | A list of Technologies that have Category1 = "Hardware." |
| SOC:Message | A list of Messages. |
| SOC:Operating System | A list of Technologies that have Category1 = "Operating System." |
| SOC:Person | A list of Persons. |
| SOC:Problem | A list of Problem Tickets. |
| SOC:Product | A list of Technologies that are do not have Category1 = "Hardware" or Category1 = "Operating System." |
| SOC:Sensor | A list of all Installs that are not Sentries. |
| SOC:Sentry | A list of all Installs that are Sentries. |
| SOC:Symptoms | A list of all Symptoms. |
| SOC:TimeZone | A list of all TimeZones. |
| SOC:Tool | A list of all Technologies. |
| SOC:Vulnerabilities | A list of all Vulnerabilities. |

TABLE 24

Notifications

| Notify Individual/Group | Reason |
|---|---|
| Assigned to Group | Problem submitted. |
| Assigned to Group | Problem reassigned. |
| Assigned to Group | Escalation conditions. |

TABLE 25

Vulnerability Information

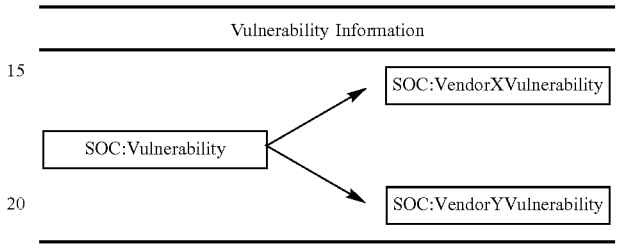

Vulnerability information from an outside vendor may be received in a variety of formats. An exemplary format is the following three column text table.

| Name | Field Type | Description |
|---|---|---|
| ID | Char 30 | Unique identifier for this vulnerability |
| Local | Radio Button | The vulnerability is exploitable locally on the system or device. |
| Description | Char 0 | A detailed description of the vulnerability. |
| Published | Date/Time | The date the vulnerability was made public. |
| Other fields . . . | . . . | . . . |

A vendor of vulnerability information can be required to specify fields. When specifying fields, the vendor should send the name of the field, a brief description of the field and the data type of the field. Some exemplary datatype rules are as follows:

Always specify a length for a character field. Char 0 specifies a field that is 0–64 MB of data in length. Use lengths that have a reasonable maximum size (e.g., less than 512 characters).

Fields with a range of values should have those values listed under the type, for example (True, False), (Yes, No) and (Unlikely, Likely, Definite).

Date/Time format is preferred for date and time values. If data cannot be sent in Date/Time format, then it can be sent as a character field.

In a preferred embodiment, each vendor of vulnerability information should send information in a format that can be imported into a SOCRATES database. One possible format is comma-separated values ("CSV") form. A SOCRATES form can be created and a CSV file with the header information can be sent to the vendor. The vendor can then email back a CSV file with the vulnerability data. This data should be made to adhere to certain rules, such as the following:

The vendor must create a unique identifier for each row of data.

On any given set of data, a row of data should be sent only once (no duplicate data in a CSV file).

To change the data for a vulnerability, send an entire row of data for that unique identifier in a download file.

The vendor may send the entire set of data in each CSV file or send only changes and updates. The decision may be left to the vendor.

DateTime is sent in the standard "Month Day, Year" format, for example: "Oct. 01, 1988"

TABLE 26. Naming Conventions

The SOCRATES system can employ naming conventions and standards to facilitate consistent workflow, easy to follow applications, and migration to new versions. For example, all SOCRATES forms and menus can be prefixed with the characters "SOC" followed by a full worded description. In addition, all active links and filters can be prefixed with the characters "SOC" followed by an abbreviation for the attached form followed by a frill worded description. Exemplary abbreviations for each form can be as follows:

| Data Category | Abbreviation |
| --- | --- |
| SOC:Change Request | CR |
| SOC:Company | CO |
| SOC:Contacts | CI |
| SOC:Diagnosis | DI |
| SOC:Gateway Message | GM |
| SOC:Install | IN |
| SOC:Message | ME |
| SOC:Person | PE |
| SOC:Problem Ticket | PR |
| SOC:SecurityFocusVulnerability | SF |
| SOC:Symptom | SY |
| SOC:SymptomToDiagnosis | SD |
| SOC:SymToTechnology | ST |
| SOC:Technology | TO |
| SOC:TimeZone | TZ |
| SOC:Vulnerability | VU |
| SOC:VulnerabilityToDiagnosis | VD |
| SOC:VulnToTechnology | VT |

What is claimed is:

1. A method of operating a probe as part of a security monitoring system for a computer network, comprising:
   a) collecting status data from at least one monitored component of said network;
   b) analyzing status data to identify potentially security-related events represented in the status data, wherein the analysis includes filtering followed by an analysis of post-filtering residue, wherein the post-filtering residue is data neither discarded nor selected by filtering;
   c) transmitting information about said identified events to an analyst associated with said security monitoring system;
   d) receiving feedback at the probe based on empirically-derived information reflecting operation of said security monitoring system; and
   e) dynamically modifying an analysis capability of said probe during operation thereof based on said received feedback.

2. The method of claim 1, wherein said identifying step includes performing a multi-stage analysis of said status data.

3. The method of claim 2, wherein said multi-stage analysis includes performing a discrimination analysis on said status data.

4. The method of claim 3, wherein the discrimination analysis includes positive filtering.

5. The method of claim 3, wherein the discrimination analysis includes negative filtering.

6. The method of claim 2, wherein said multi-stage analysis includes analysis at the probe and analysis at a secure operations center configured to receive data from said probe.

7. The method of claim 1, wherein said identifying step includes aggregating and synthesizing said status data at the probe.

8. The method of claim 7, wherein said identifying step includes cross-correlating data across said monitored components.

9. The method of claim 7, wherein said identifying step includes analyzing the frequency of occurrence of said events.

10. The method of claim 1, further comprising after said step (c), performing further computer-based analysis at a secure operations center configured to receive data from said probe.

11. The method of claim 10, wherein said computer-based analysis includes aggregating, synthesizing, and presenting alerts on an ensemble basis.

12. The method of claim 10, wherein said identifying step includes cross-correlating data across said monitored components.

13. The method of claim 10, wherein said identifying step includes analyzing the frequency of occurrence of said events.

14. The method of claim 10, wherein said computer-based analysis includes cross-probe correlation.

15. The method of claim 1, further comprising instantaneously self-tuning said probe based on previously collected status data.

16. The method of claim 1, wherein said dynamic modifying step includes consideration of non-real-time information from ongoing security research efforts.

17. The method of claim 1, wherein said receiving feedback step occurs in substantially real time.

18. A security monitoring system for a computer network, comprising:
   a) a plurality of sensors for monitoring components of said network;
   b) at least one secure operations center configured to receive and analyze potentially security-related event data from at least one probe; and
   c) at least one probe, wherein said probe is configured to
      (1) collect status data from at least one sensor monitoring at least one component of said network;
      (2) analyze status data to identify potentially security-related events represented in the status data, wherein the analysis includes filtering followed by an analysis of post-filtering residue, wherein the post-filtering residue is data neither discarded nor selected by filtering;
      (3) transmit information about said identified events to an analyst associated with said secure operations center;
      (4) receive feedback based on empirically-derived information reflecting operation of said security monitoring system; and
      (5) dynamically modify an analysis capability of said probe during operation thereof based on said received feedback.

19. The security monitoring system of claim 18, wherein said probe is configured to identify potentially security-related events by performing a discrimination analysis on said status data.

20. The security monitoring system of claim 19, wherein said probe is configured to identify potentially security-related events by performing a positive filter discrimination analysis on said status data.

21. The security monitoring system of claim 19, wherein said probe is configured to identify potentially security-related events by performing a negative filter discrimination analysis on said status data.

22. The security monitoring system of claim 18, wherein said probe and said secure operations center are configured to identify potentially security-related events by performing a multistage analysis of said status data.

23. The security monitoring system of claim 22, wherein said multi-stage analysis includes analysis at the probe and analysis at said secure operations center.

24. The security monitoring system of claim 18, wherein said secure operations center is configured to identify potentially security-related events by performing a computer-based analysis of said potentially security-related event data received from said probe.

25. The security monitoring system of claim 24, wherein said computer-based analysis is configured to correlate data from different probes.

26. A computer-readable medium whose contents cause a computer system to operate a probe as part of a security monitoring system for a computer network, by performing the steps of:
 a) collecting status data from at least one monitored component of said network;
 b) analyzing status data to identify potentially security-related events represented in the status data, wherein the analysis includes filtering followed by an analysis of post-filtering residue, wherein the post-filtering residue is data neither discarded nor selected by filtering;
 c) transmitting information about said identified events to an analyst associated with said security monitoring system;
 d) receiving feedback at the probe based on empirically-derived information reflecting operation of said security monitoring system; and
 e) dynamically modifying an analysis capability of said probe during operation thereof based on said received feedback.

27. The computer-readable medium of claim 26, wherein said identifying step includes performing a multi-stage analysis of said status data.

28. The computer-readable medium of claim 27, wherein said multi-stage analysis includes performing a discrimination analysis on said status data.

29. The computer-readable medium of claim 28, wherein the discrimination analysis includes positive filtering.

30. The computer-readable medium of claim 28, wherein the discrimination analysis includes negative filtering.

31. The computer-readable medium of claim 27, wherein said multi-stage analysis includes analysis at the probe and analysis at a secure operations center configured to receive data from said probe.

32. The computer-readable medium of claim 26, wherein said identifying step includes aggregating and synthesizing said status data at the probe.

33. The computer-readable medium of claim 32, wherein said identifying step includes cross-correlating data across said monitored components.

34. The computer-readable medium of claim 32, wherein said identifying step includes analyzing the frequency of occurrence of said events.

35. The computer-readable medium of claim 26, further comprising after said step (c), performing further computer-based analysis at a secure operations center configured to receive data from said probe.

36. The computer-readable medium of claim 35, wherein said computer-based analysis includes aggregating, synthesizing, and presenting alerts on an ensemble basis.

37. The computer-readable medium of claim 35, wherein said identifying step includes cross-correlating data across said monitored components.

38. The computer-readable medium of claim 35, wherein said identifying step includes analyzing the frequency of occurrence of said events.

39. The computer-readable medium of claim 35, wherein said computer-based analysis includes cross-probe correlation.

40. The computer-readable medium of claim 26, further comprising instantaneously self-tuning said probe based on previously collected status data.

41. The computer-readable medium of claim 26, wherein said dynamic modifying step includes consideration of non-real-time information from ongoing security research efforts.

42. The computer-readable medium of claim 26, wherein said receiving feedback step occurs in substantially real time.

* * * * *

UNITED STATES PATENT AND TRADEMARK OFFICE
CERTIFICATE OF CORRECTION

PATENT NO.       : 7,159,237 B2  Page 1 of 1
APPLICATION NO.  : 09/766343
DATED            : January 2, 2007
INVENTOR(S)      : Schneier et al.

It is certified that error appears in the above-identified patent and that said Letters Patent is hereby corrected as shown below:

On the Title Page

Insert Item (63), --This Application claims benefit of Provisional Application 60/190,326, filed on January 19, 2001--.

Signed and Sealed this

Seventh Day of October, 2008

JON W. DUDAS
*Director of the United States Patent and Trademark Office*